US011850810B2

(12) United States Patent
Wirrick

(10) Patent No.: US 11,850,810 B2
(45) Date of Patent: Dec. 26, 2023

(54) SKIN-BONDED THREADED INSERTS, SANDWICH PANELS INCLUDING THE SAME, AND RELATED METHODS

(71) Applicant: The Boeing Company, Chicago, IL (US)

(72) Inventor: Jeffrey Thomas Ikaika Wirrick, Mill Creek, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/726,972

(22) Filed: Apr. 22, 2022

(65) Prior Publication Data

US 2022/0371294 A1 Nov. 24, 2022

Related U.S. Application Data

(60) Provisional application No. 63/190,165, filed on May 18, 2021.

(51) Int. Cl.
*F16B 5/02* (2006.01)
*B29C 70/68* (2006.01)
(Continued)

(52) U.S. Cl.
CPC .......... *B29C 70/682* (2013.01); *B29C 70/683* (2013.01); *B29C 70/685* (2013.01);
(Continued)

(58) Field of Classification Search
CPC ........ F16B 5/01; F16B 5/0258; F16B 11/006; F16B 39/225; F16B 43/001; F16B 5/02
(Continued)

(56) References Cited

U.S. PATENT DOCUMENTS

| 813,990 | A | * | 2/1906 | Ricke | .................. | B65D 39/084 |
| | | | | | | 16/2.4 |
| 871,444 | A | * | 11/1907 | Ricke | .................. | B65D 39/084 |
| | | | | | | 16/2.4 |

(Continued)

FOREIGN PATENT DOCUMENTS

| DE | 102014014624 | 4/2016 |
| DE | 102015211798 | 9/2016 |

(Continued)

OTHER PUBLICATIONS

Machine-generated translation of DE102014014624, downloaded from Espacenet.com on Dec. 26, 2018.

(Continued)

*Primary Examiner* — Roberta S Delisle
(74) *Attorney, Agent, or Firm* — Kolitch Romano Dascenzo Gates LLC

(57) ABSTRACT

Skin-bonded threaded inserts may be installed within a sandwich panel by curing the insert in place as the sandwich panel is cured. Skin-bonded threaded inserts may include a collar that is transitioned between a raised position and a compressed position during installation of the skin-bonded threaded insert in the sandwich panel, due to compression of the sandwich panel during curing. Skin-bonded threaded inserts may include one or more flanges that engage one or more skins of the sandwich panel. Such flanges may be positioned between two skins, or between the core and a skin of the sandwich panel to secure the sandwich panel in place within the sandwich panel. Skin-bonded threaded inserts may be positioned within a sandwich panel without the use of potting compound and may engage with the skins of the sandwich panel, rather than relying on adherence to the core for sufficient pull-out and shear strength.

20 Claims, 15 Drawing Sheets

(51) Int. Cl.
*B29L 31/30* (2006.01)
*B29K 105/00* (2006.01)
*B29K 105/20* (2006.01)
*B29K 101/10* (2006.01)

(52) U.S. Cl.
CPC .. *B29C 2793/0027* (2013.01); *B29K 2101/10* (2013.01); *B29K 2105/0097* (2013.01); *B29K 2105/20* (2013.01); *B29K 2995/0074* (2013.01); *B29L 2031/3076* (2013.01); *F16B 5/0258* (2013.01)

(58) Field of Classification Search
USPC ............... 16/2.4; 411/82, 82.2, 383, 432
See application file for complete search history.

(56) References Cited

U.S. PATENT DOCUMENTS

| | | | |
|---|---|---|---|
| 1,056,452 | A | 3/1913 | Remhilt |
| 1,194,792 | A | 8/1916 | Stewart |
| 2,098,389 | A | 11/1937 | Hutchison |
| 2,883,012 | A | 4/1959 | Hoffman |
| 3,078,002 | A | 2/1963 | Rodgers, Jr. |
| 3,174,523 | A | 3/1965 | Hult |
| 3,252,493 | A | 5/1966 | Smith |
| 3,384,142 | A | 5/1968 | Phelan |
| 3,512,328 | A | 5/1970 | Erikson |
| 3,579,942 | A | 5/1971 | Cole |
| 3,601,278 | A | 8/1971 | Merz |
| 3,621,557 | A | 11/1971 | Cushman et al. |
| 3,640,327 | A | 2/1972 | Burt |
| 3,678,535 | A | 7/1972 | Charles |
| 3,678,980 | A | 7/1972 | Gutshall |
| 3,778,957 | A | 12/1973 | Appleberry |
| 3,962,843 | A | 6/1976 | King, Jr. |
| 4,266,687 | A | 5/1981 | Cummings |
| 4,283,898 | A | 8/1981 | Claver |
| 4,423,819 | A | 1/1984 | Cummings |
| 4,509,308 | A | 4/1985 | Dettfurth et al. |
| 4,717,612 | A | 1/1988 | Shackelford |
| 4,981,735 | A | 1/1991 | Rickson |
| 5,006,025 | A | 4/1991 | Duran |
| 5,093,957 | A | 3/1992 | Do |
| 5,253,967 | A | 10/1993 | Orban et al. |
| 5,620,287 | A | 4/1997 | Pratt |
| 6,126,355 | A | 10/2000 | Clover, Jr. |
| 6,488,460 | B1 | 12/2002 | Smith et al. |
| 6,641,343 | B1 | 11/2003 | Duran |
| 8,382,415 | B1 | 2/2013 | Goldbaum |
| 8,745,819 | B2* | 6/2014 | Embler ............... F16B 5/0241 16/2.2 |
| 8,814,430 | B2 | 8/2014 | Veternik et al. |
| 9,003,662 | B2* | 4/2015 | Burd ................ F16B 5/02 411/432 |
| 9,757,867 | B2 | 9/2017 | Heine et al. |
| 9,976,583 | B2 | 5/2018 | Lopez et al. |
| 10,099,767 | B2 | 10/2018 | Lewis et al. |
| 10,228,003 | B2 | 3/2019 | Nipper et al. |
| 10,730,604 | B2 | 8/2020 | Lewis et al. |
| 2004/0265091 | A1 | 12/2004 | Cheung |
| 2005/0103433 | A1 | 5/2005 | Flynn et al. |
| 2006/0137294 | A1 | 6/2006 | Waits Jr. et al. |
| 2007/0102094 | A1* | 5/2007 | de Groot ............. B29C 66/721 264/445 |
| 2008/0008558 | A1* | 1/2008 | Costabel ............... F16B 37/12 411/438 |
| 2008/0031685 | A1 | 2/2008 | Dupriest et al. |
| 2012/0114898 | A1* | 5/2012 | Kostick .................. B32B 25/08 428/354 |
| 2012/0174765 | A1 | 7/2012 | Kunda |
| 2012/0189401 | A1 | 7/2012 | Chiu |
| 2013/0108392 | A1 | 5/2013 | Henricksen, Jr. |
| 2013/0240701 | A1 | 9/2013 | Marks |
| 2016/0069375 | A1 | 3/2016 | Henricksen, Jr. |
| 2017/0253006 | A1 | 9/2017 | Lopez et al. |
| 2018/0291946 | A1* | 10/2018 | Mallard ................ F16J 15/068 |
| 2022/0282750 | A1* | 9/2022 | Rice ...................... F16B 37/12 |

FOREIGN PATENT DOCUMENTS

| | | | |
|---|---|---|---|
| EP | 0273515 | A1 | 7/1988 |
| EP | 2594809 | A1 | 5/2013 |
| EP | 2610505 | A1 | 7/2013 |
| EP | 3059459 | A1 | 8/2016 |
| GB | 861884 | A | 3/1961 |
| GB | 1059928 | A | 2/1967 |
| GB | 2017857 | A | 10/1979 |
| WO | WO2009050239 | A1 | 4/2009 |
| WO | WO2014088600 | A1 | 6/2014 |
| WO | WO2017049130 | A1 | 3/2017 |

OTHER PUBLICATIONS

Machine-generated translation of DE102015211798, downloaded from Espacenet.com on Dec. 26, 2018.
Machine-generated translation of description of WO2009050239A1, downloaded from Espacenet.com on Apr. 21, 2022.
Printout of screenshots of Dupo, Threaded Inserts webpage, downloaded from dupo.nl on Apr. 6, 2015.
Printout of Shur-Lok Products, Fasteners for Sandwich Structure webpage, downloaded from shur-lok.eu/contents/products/sandwich on Jan. 14, 2016.
"TYE2400 Series Insert: Molded In, Adjustable, Threaded, Self-Locking, Clearance Hole, Sandwich Panel," The Young Engineers, Inc., available at least as early as Mar. 31, 1989.
Printout of The Young Engineers, Inc., New Products webpage, downloaded from youngengineers.com/newproducts on Apr. 6, 2015.
Printout of The Young Engineers, Inc., Composite Fasteners, Non-metallic Fasteners webpage, downloaded from youngengineers.com/Composites on Jan. 14, 2016.
Printout of The Young Engineers, Inc., Floating Nut Fasteners webpage, downloaded from youngengineers.com/Floaters on Jan. 14, 2016.
Printout of The Young Engineers, Inc., Loret Isolator Inserts webpage, downloaded from youngengineers.com/Isolators on Jan. 14, 2016.
Printout of The Young Engineers, Inc., Molded In Threaded Fasteners webpage, downloaded from youngengineers.com/MoldedInThreaded on Jan. 14, 2016.
Printout of MSC Industrial Supply Co., Brass Press Fit Fastener webpage, downloaded from mscdirect.com/industrialtools/brass-press-fit-fastener on Jan. 8, 2016.

* cited by examiner

SKIN-BONDED THREADED INSERTS, SANDWICH PANELS INCLUDING THE SAME, AND RELATED METHODS

RELATED APPLICATION

The present application is a non-provisional of and claims priority to U.S. Provisional Patent Application No. 63/190,165, filed on May 18, 2021, entitled "SKIN-BONDED THREADED INSERTS, SANDWICH PANELS INCLUDING THE SAME, AND RELATED METHODS," the complete disclosure of which is incorporated by reference.

FIELD

The present disclosure relates to skin-bonded threaded inserts, sandwich panels including the same, and related methods.

BACKGROUND

Sandwich panels (e.g., a core structure sandwiched between two layers of material, or skins) are often used in the construction of aircraft, because they have high strength-to-weight ratios. Depending on the specific location and application of a sandwich panel in an aircraft, one or more inserts (e.g., round inserts) may be required to be inserted within or through a sandwich panel in order to affix one or more other structures or fasteners to the panel. Round inserts may be used to transfer localized loads (e.g., via a pin, bolt, screw, joint, or other structure) to the sandwich panel, such as to fasten the sandwich panel to another structure, join multiple sandwich panels to each other, and/or attach one or more external objects to the sandwich panel. For example, round inserts may provide a channel for wire bundles to be passed from one side of the sandwich panel to the other, or round inserts may be configured to receive a pin or bolt or other fastener in order to secure another panel or object to the sandwich panel, via the round insert. In the aerospace industry, such sandwich panels and round inserts may be used to assemble the interior main structure and/or secondary structures of the aircraft, and/or may be used to form floor boards, wall panels, galleys, stow bins, overhead compartments, lavatories, and/or other structures within the aircraft. Such sandwich panels and round inserts are also used in other industries.

FIGS. 1 and 2 illustrate a conventional round insert 10 installed in a sandwich panel 11, shown schematically in cross-section. Sandwich panel 11 may include a core 13 sandwiched between a first skin 15 and a second skin 17. First skin 15 and second skin 17 may be rigid or semi-rigid skins, and are typically relatively thin compared to core 13, which is typically formed of a lightweight material. Conventional round insert 10 may be inserted into a circular bore 19 formed in sandwich panel 11, which may be a blind bore 21 (FIG. 1) or a through-bore 23 (FIG. 2). Blind bore 21 may extend through one of the skins (e.g., first skin 15) and into the core 13, towards the other skin (e.g., second skin 17), whereas through-bore 23 may extend entirely through first skin 15, second skin 17, and core 13. As shown in FIGS. 1 and 2, a flange portion 27 of conventional round insert 10 may be substantially flush with one of more of first skin 15 and second skin 17, or, as shown in FIG. 3, flange portion 27 of conventional round insert 10 may lay on top of (e.g., on an outer surface of) first skin 15 or second skin 17.

In conventional techniques, an adhesive material, such as a potting compound or epoxy, is injected through potting holes, or vents, in conventional round insert 10 to fill a gap or space 29 between conventional round insert 10 and core 13 of sandwich panel 11. The adhesive material, once fully cured, serves to secure the insert in place within bore 19 of sandwich panel 11, substantially preventing relative movement of conventional round insert 10 with respect to sandwich panel 11 and retaining conventional round insert 10 within circular bore 19 (e.g., resisting pull-out, rotation, and lateral movement of conventional round insert 10) once the adhesive compound dries, solidifies, and/or cures. In other words, the potting compound secures conventional round insert 10 in place by adhering the interface between conventional round insert 10 and core 13. However, the use of such adhesive compounds is labor-intensive and may take a significant period of time to cure, such as 2-6 hours or more. During this time, the conventional round insert is not stable within the sandwich panel, and loads cannot be applied to conventional round insert 10, which limits through-put and overall efficiency of the manufacturing process. Furthermore, often, conventional round inserts 10 must be held in place during the cure time (e.g., with the application of masking tape to hold conventional round insert 10 in place), and even with such mitigating techniques, the insert may shift during curing.

In some methods, if excess adhesive material has squeezed out around conventional round insert 10, it must be removed from conventional round insert 10, so that secondary objects (e.g., brackets) may be substantially flush with the insert and sandwich panel. Conventional round inserts 10 and methods of using and/or installing the same also may suffer from "high inserts" or "low inserts," where the conventional round insert is ultimately positioned too far out of the circular bore ("high") or too far into the circular bore ("low"), respectively (e.g., the outer surface of conventional round insert 10 may be too "high," sticking out of the circular bore, or too "low," too far recessed within the circular bore, in either case thereby creating an un-smooth, or non-flush, interface with the sandwich panel skin). Such imperfect positioning may be the result of shifting during cure time and/or poor initial placement, and may prevent the proper positioning of the bracket or other secondary device secured via conventional round insert 10. Often times, the shear strength of the resulting installation is dependent on the insert being flush with the skins of the sandwich panel. Expansion forces from the adhesive material expanding during curing may also contribute to defects, such as shifting of conventional round insert 10, and may cause visible "mark-off" on the opposite side of the sandwich panel, often an unacceptable result in the finished product.

The use of adhesive material to bond a conventional round insert 10 within the circular sandwich panel bore may disadvantageously prevent automation of the manufacturing technique. Furthermore, installation of an incorrect type of conventional round insert 10 may be difficult and time-consuming to correct, especially in techniques where the conventional round inserts are secured with adhesive material. Many different types of conventional round inserts may be installed within a single sandwich panel, and of the different types of conventional round inserts, they may be interchangeable within the same size circular bores formed in the sandwich panel, thereby making the installation of an incorrect conventional round insert fairly commonplace. Adhesive materials used in conventional techniques also may fail, even after curing, which may result in pull-out of conventional round insert 10 from the circular bore or spinning of the insert within the circular sandwich panel bore when torque forces breakage of the bond between the conventional round insert and the adhesive compound. In other words, pull-out strength of conventionally installed round inserts is dependent on the potting compound. Such issues with conventional round inserts 10 and methods of installing the same within a sandwich panel are on-going and problematic in a variety of industries.

SUMMARY

Presently disclosed inserts for use with sandwich panels, and related methods (e.g., methods of installing one or more such inserts in a sandwich panel) may address one or more issues with prior art, conventional round inserts and related methods. For example, some inserts according to the present disclosure may be retained within the sandwich panel without the use of adhesive potting compound, may be cured in place within the sandwich panel at the same time the sandwich panel is cured (thereby reducing or eliminating steps in the manufacturing process), and/or may be installed such that the insert relies on its interface with one or more skins of the sandwich panel (as opposed to the interface with the core of the sandwich panel) to maintain pull-out and shear strength.

One example of an insert according to the present disclosure includes a main body configured to extend longitudinally through at least part of the core of a sandwich panel from a first transverse face of the main body to a second transverse face of the main body, a hole extending longitudinally through at least a portion of the main body, and a collar that is sized with respect to the first enlarged portion of the hole such that an external surface of the collar has a friction fit with the first enlarged portion. An exterior circumferential surface of the main body may be configured to engage the core of the sandwich panel when the skin-bonded threaded insert is installed in the sandwich panel. The hole may include a threaded portion that is threaded such that it is configured to engage a fastener, and the threaded portion may extend longitudinally along at least a portion of a length of the hole in a longitudinal direction. The threaded portion may have a major diameter corresponding to a maximum diameter of the threaded portion. The hole also may include a first enlarged portion having an enlarged diameter that is greater than the major diameter of the threaded portion and a shelf formed at a transition between the first enlarged portion and the threaded portion. The collar may be configured to be longitudinally translated with respect to the main body, to transition the collar between a raised position and a compressed position during installation of the skin-bonded threaded insert in the sandwich panel.

In another example, a skin-bonded threaded insert may include a main body configured to extend longitudinally through the core of a sandwich panel, a hole extending longitudinally through at least a portion of the main body, and an enlarged flange having a flange diameter that is larger than a body diameter of the main body. The enlarged flange may protrude radially from the main body at a position along a longitudinal axis of the main body, wherein the position is between a first transverse face of the main body and an opposite second transverse face of the main body, such that the enlarged flange is longitudinally offset from both the first transverse face the second transverse face. The enlarged flange may be configured to be positioned interiorly to the second skin and/or the third outer skin of the sandwich panel.

Related methods are also disclosed. For example, one method of installing a skin-bonded threaded insert into a sandwich panel may include performing ultrasonic cutting to shape a first skin of the sandwich panel, positioning a core of the sandwich panel on the first skin such that a first face of the core faces the first skin, forming a bore in the core of the sandwich panel, inserting the skin-bonded threaded insert into the bore, placing a second skin of the sandwich panel onto the second face of the core, such that a collar of the skin-bonded threaded insert sits proud of an outer surface of the second skin, and compressing the first skin, the core, and the second skin together, with the skin-bonded threaded insert in the bore. When inserting the skin-bonded threaded insert into the bore, at least a portion of a main body of the skin-bonded threaded insert may be positioned within the bore, and the collar of the skin-bonded threaded insert may be in a raised position in which the collar sits proud of a second face of the core, with the second face of the core being opposite the first face of the core. The second skin may include a through-hole extending through the second skin, such that the collar extends through the through-hole once the second skin in placed on the core. Compressing the first skin, the core, and the second skin together may cause the collar to be longitudinally translated with respect to the main body, to transition the collar between a raised position and a compressed position.

DESCRIPTION

Figure 1:
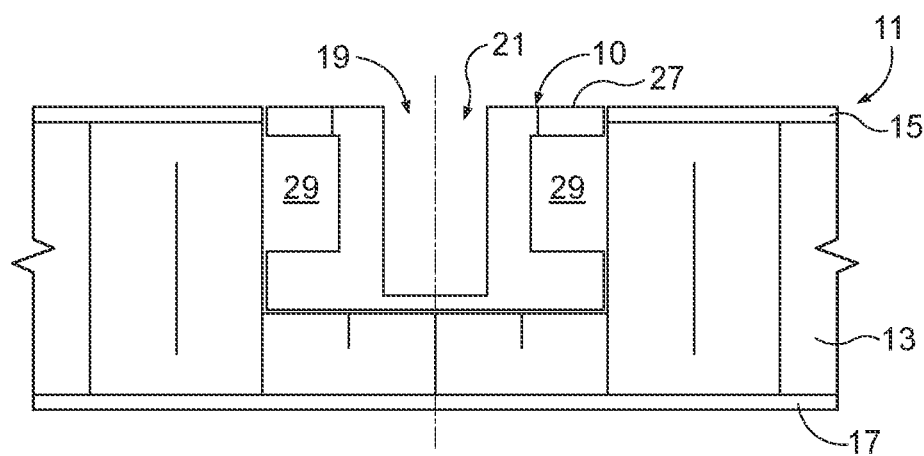
FIG. 1 is a schematic, cross-section view of a prior art insert positioned within a blind bore formed in a sandwich panel, the insert being flush with the sandwich panel skin.
Figure 2:
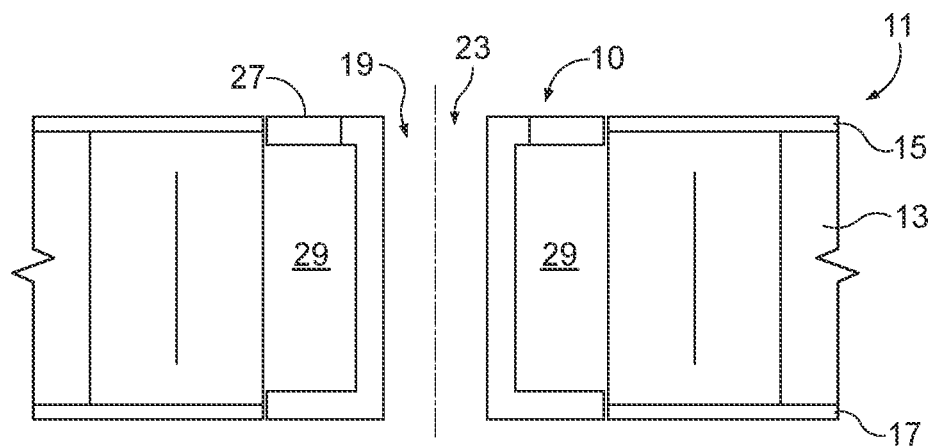
FIG. 2 is a schematic, cross-section view of a prior art insert positioned within a through-bore formed in a sandwich panel, the insert being flush with the sandwich panel skin.
Figure 3:
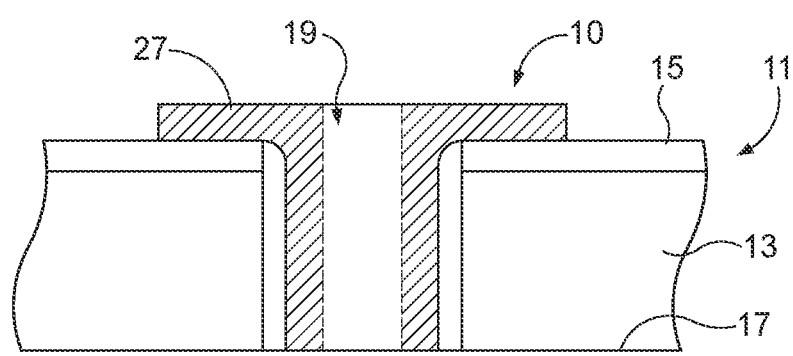
FIG. 3 is a schematic, cross-section view of a prior art insert positioned with respect to a sandwich panel.
Figure 4:
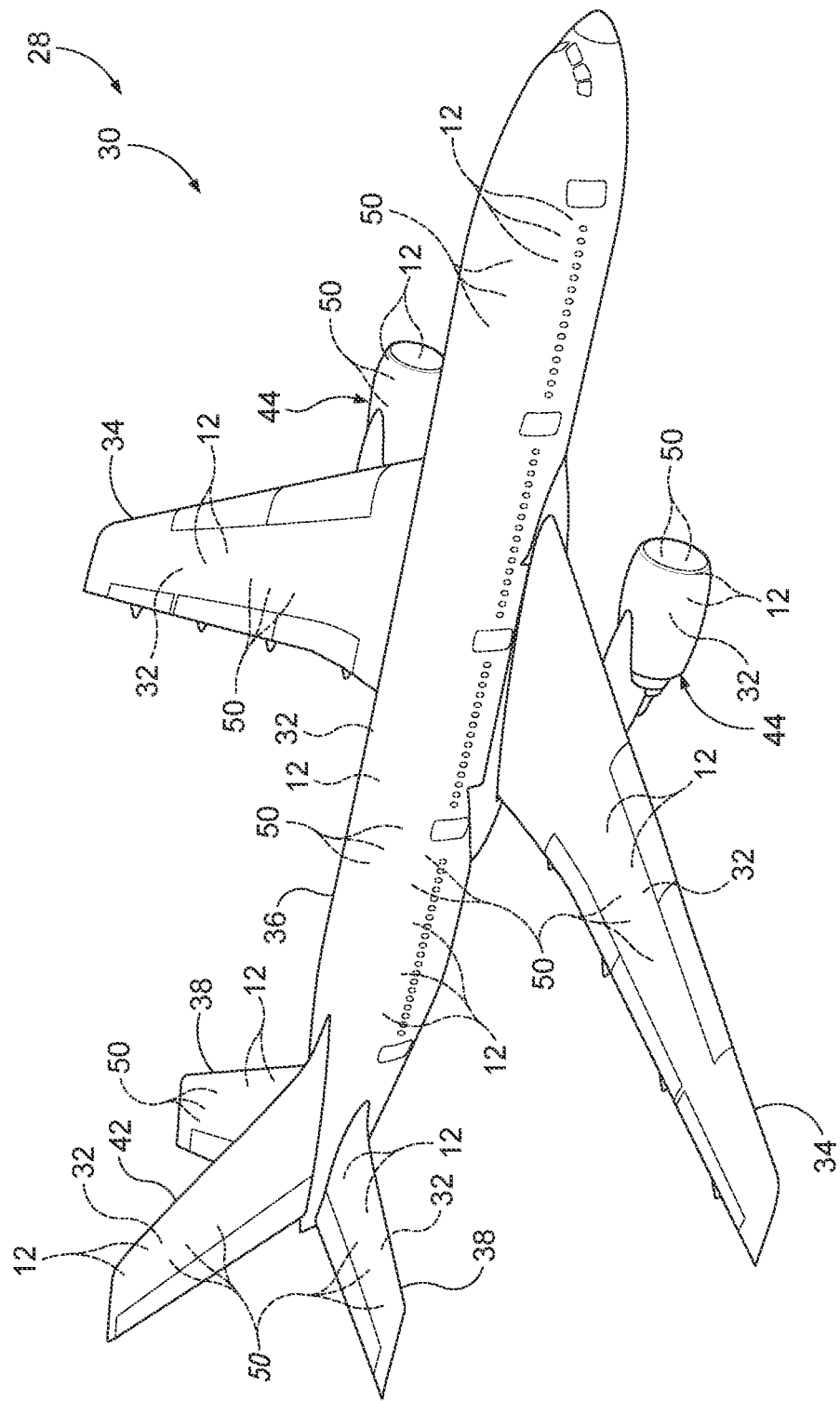
FIG. 4 is a perspective, schematic view of illustrative, non-exclusive examples of an apparatus that may include one or more sandwich panels including one or more inserts according to the present disclosure.

With reference to FIG. 4, one or more inserts 50 according to the present disclosure may be installed in a sandwich panel, which may be useful in many different applications, at least partly due to their high strength-to-weight ratios. For example, such sandwich panels including one or more inserts 50 may be useful in the aerospace, automotive, electronic, construction, military, recreation, and/or motorsport industries. In FIG. 4, an example of an apparatus 28 that may include one or more sandwich panels 12 and inserts 50 generally is illustrated in the form of an aircraft 30. Aircraft 30 may take any suitable form, including commercial aircraft, military aircraft, or any other suitable aircraft. While FIG. 4 illustrates an aircraft 30 in the form of a fixed wing aircraft, other types and configurations of aircraft are within the scope of aircraft 30 according to the present disclosure, including (but not limited to) rotorcraft and helicopters.

Figure 5:
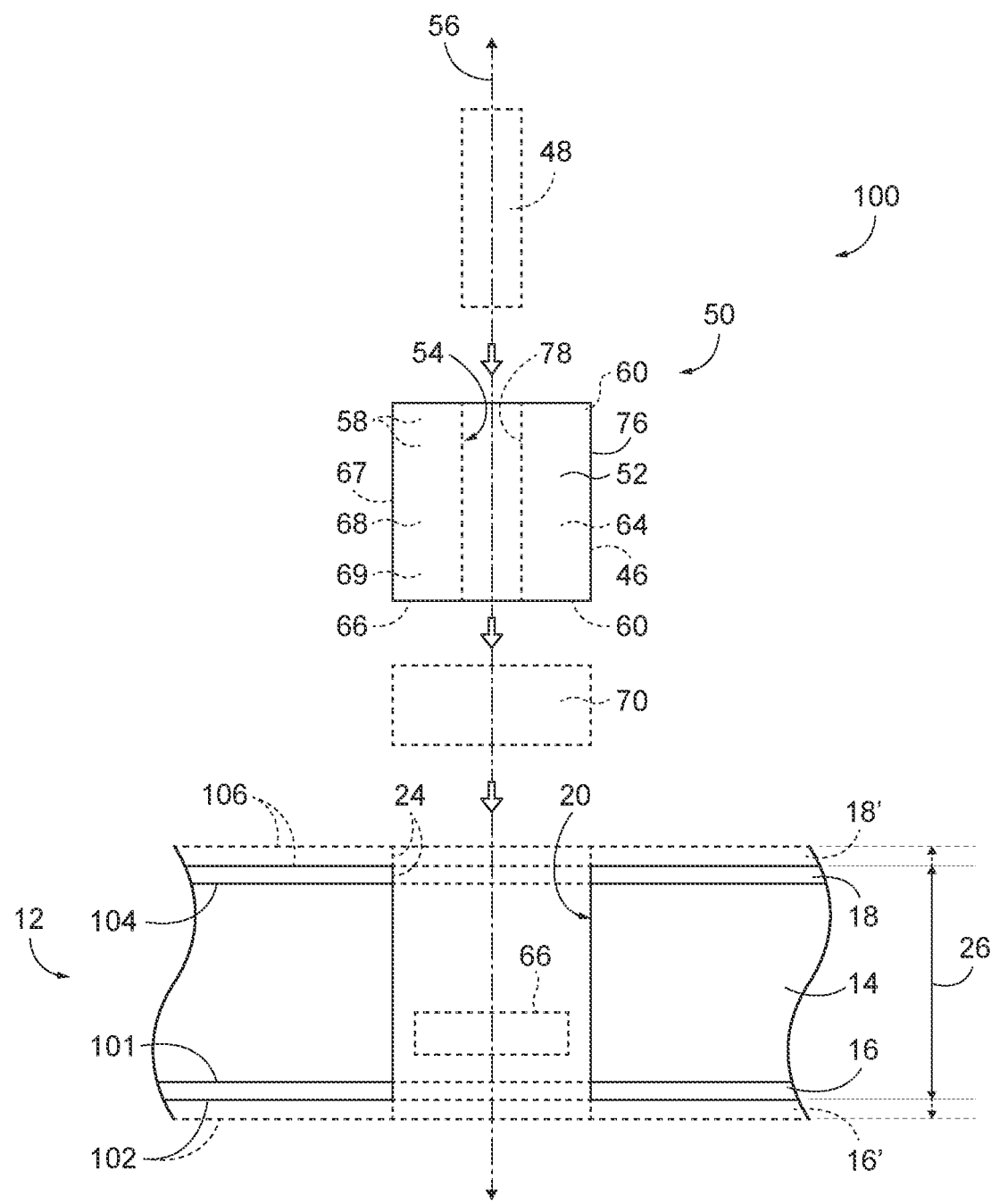
FIG. 5 is a schematic view of illustrative, non-exclusive systems according to the present disclosure, including one or more skin-bonded threaded inserts inserted in a sandwich panel.

Apparatus 28 (e.g., aircraft 30) may include one or more structures 32 formed from one or more sandwich panels 12, one or more of which may be composite panels. With reference to FIG. 5, each sandwich panel 12 includes a core 14 formed of a relatively lightweight material, such as a plurality of elongate cells, typically having hexagonal or rectangular cross-sections. Such cores 14 may be referred to as honeycomb cores, but other shapes and configurations also may be used, such as a corrugated structure and/or foam materials. Core 14 may include an open-cell structure and/or a closed-cell structure. Core 14 may be formed of foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and/or polypropylene. Sandwich panels 12 include at least two skins, first skin 16 being positioned on one side of core 14 and second skin 18 being positioned on the other side of core 14, arranged to form a layered sandwich structure. In other words, first skin 16 is opposite second skin 18, with core 14 being positioned between first skin 16 and second skin 18. The skins 16, 18 are typically rigid, with core 14 spanning between the skins. First skin 16 and second skin 18 may be formed of a laminate of fiberglass-reinforced polymer, a laminate of carbon fiber-reinforced polymer, a thermoset polymer, an epoxy, sheet metal, carbon, aramid, aluminum, steel, plywood, balsa, teak, and/or hardwood. First skin 16 and second skin 18 may be formed of the same material(s) in some examples, or may be formed of different materials in other examples. One or more additional skins 16' and/or 18' may be coupled to first skin 16 and/or second skin 18, in some examples. Some composite sandwich panels 12 are formed of a plurality of first skins 16 and/or a plurality of second skins 18 secured together without a core.

With reference again to FIG. 4, structures 32 may include one or more sandwich panels 12, joints formed between two or more sandwich panels 12, and/or three-dimensional structures formed using one or more sandwich panels 12. As illustrative, non-exclusive examples, structures 32 may be utilized in aircraft structures such as wings 34, fuselages 36, horizontal stabilizers 38, overhead storage bins, vertical stabilizers 42, and engine housings 44; however, other components of aircraft 30 additionally or alternatively may include structures 32 such as sandwich panels 12 and/or joints formed between two or more sandwich panels 12. Other applications in aircraft 30 for sandwich panels 12 and one or more inserts 50 include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, apparatus 28 (including one or more sandwich panels 12 and inserts 50) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

FIG. 5 shows a schematic representation of systems 100 that include one or more skin-bonded threaded inserts 50 (also referred to herein as simply "inserts 50") that each may be installed within a respective bore 20 of sandwich panel 12. In the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Only one respective insert 50 and bore 20 are shown in cross-section of sandwich panel 12 in FIG. 5 (and insert 50 is shown apart from bore 20 in an exploded view, for clarity), but it is to be understood that sandwich panel 12 generally includes a plurality of such bores 20 that may each receive a respective insert 50 installed therein. Generally, presently disclosed inserts 50 include a main body 52 and a hole 54 extending longitudinally through at least a portion of main body 52 (e.g., along longitudinal axis 56). Various examples of inserts 50 (or systems 100 including the same) may include one or more collars 58, one or more enlarged flanges 60, a coating 46, one or more floating threaded nuts 64, one or more adhesive packs 66, one or more notched flanges 68, a thread lock 69, and/or a second insert part 70, as will be described herein in connection with various examples of insert 50. As will be explained in connection with various examples herein, collar 58 may be used for indexing and/or aligning components of sandwich panel 12 and/or insert 50, and/or collar 58 may be configured to secure or maintain insert 50 in place within a precision cut hole in the skin of sandwich panel 12 while sandwich panel 12 is cured with insert 50 in place.

Insert 50 generally is configured to receive a secondary object 48 within hole 54, with secondary object 48 being configured to transfer a localized load to sandwich panel 12 via skin-bonded threaded insert 50. For example, secondary object 48 may be a fastener that is inserted into and/or through hole 54 of insert 50, such as to secure another object to sandwich panel 12 via insert 50. In some examples, secondary object 48 may be threaded into insert 50, via threads within insert 50. Hole 54 may be a blind hole or a through-hole. One or more portions of hole 54 may be threaded. One or more portions of hole 54 may have a different diameter than one or more other portions of hole 54.

One or more surfaces of insert 50 may be coated, such as with a coating 46, such as a thermoset resin coating 46. For example, at least a portion of first transverse face 72, second transverse face 74, and/or exterior circumferential surface 76 may be coated with a thermoset resin coating 46. In some examples, such coating 46 may be configured to flow during curing of sandwich panel 12, which may improve and/or facilitate bonding of insert 50 within bore 20 of sandwich panel 12. In other words, coating 46 may at least partially adhere insert 50 in place within sandwich panel 12. Additionally or alternatively, coating 46 may be configured to conform to imperfections in a thickness of sandwich panel 12, or within bore 20 and/or core 14. For example, coating 46 may be configured to reconnect some open hex cells in core 14 from forming bore 20, and/or may be configured to account for some variation in overall thickness of sandwich panel 12. In some examples, at least a portion of collar 58 also may include coating 46. In some examples, coating 46 comprises a phenolic resin.

Additionally or alternatively, one or more surfaces of insert 50 may be knurled. For example, at least a portion of first transverse face 72, second transverse face 74, and/or exterior circumferential surface 76 of main body 52 may be knurled. Additionally or alternatively, at least a portion of collar 58 may be knurled, such as an external surface, an upper surface, and/or a lower surface of collar 58.

Additionally or alternatively, one or more surfaces of insert 50 may be threaded. For example, at least a portion of exterior circumferential surface 76 may include external threads 67, a first enlarged portion 80 within hole 54 may be threaded, and/or some or all of hole 54 may be threaded (which is referred to herein as threaded portion 78).

Insert 50 may be configured to be bonded to sandwich panel 12 within bore 20 concurrently with the bonding together of first skin 16, second skin 18, and core 14 of sandwich panel 12. In some examples, insert 50 is configured to be bonded within bore 20 without the use of an added potting compound that would be used in conventional inserts. In this manner, systems 100 may be more efficient and offer savings as compared to prior art techniques of potting inserts in place within sandwich panels. In various examples, systems 100 may advantageously reduce processing steps, eliminate a curing step, reduce or eliminate post-processing steps, improve flushness quality issues, and/or increase strength performance of the resulting insert installation.

In various examples of systems 100, sandwich panel 12 may include a first panel hole 22 extending through first skin 16, which is generally at least substantially concentric with bore 20, and with hole 54 of insert 50 when insert 50 is positioned within bore 20. Additionally or alternatively, sandwich panel 12 may include a second panel hole 24 extending through second skin 18, which is generally at least substantially concentric with bore 20, and with hole 54 of insert 50 when insert 50 is positioned within bore 20. In other words, in some examples, hole 54 of insert 50 and bore 20 may be through-holes extending longitudinally such that secondary object 48 may pass through an entire thickness 26 of sandwich panel 12. In other examples, hole 54 and/or bore 20 may be blind holes extending longitudinally through only a portion of thickness 26 of sandwich panel 12.

First skin 16 has a first inner skin surface 101 facing core 14, and a first outer skin surface 102 opposite first inner skin surface 101. Similarly, second skin 18 has a second inner skin surface 104 facing core 14, and a second outer skin surface 106 opposite second inner skin surface 104. As best seen in FIG. 5, core 14 is sandwiched between first inner skin surface 101 and second inner skin surface 104, with bore 20 formed in first skin 16 and/or second skin 18, and extending into and/or through core 14.

For example, in some systems 100, bore 20 is formed in first skin 16 and extends into core 14 towards second skin 18. Additionally or alternatively, in some systems, bore 20 is formed in second skin 18 and extends into core 14 towards first skin 16. Sandwich panel 12 includes at least one bore 20, but often includes a plurality of bores 20, with each respective bore 20 extending from first skin 16 and/or second skin 18, and into core 14. Systems 100 also may include a plurality of inserts 50, with each of the plurality of inserts 50 being installed within a respective bore 20 of the plurality of bores 20.

Core 14 may comprise foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, polypropylene, and/or any other suitable material. First skin 16 and second skin 18 may comprise a laminate of fiberglass-reinforced polymer, a laminate of carbon fiber-reinforced polymer, a thermoset polymer, an epoxy, sheet metal, carbon, aramid, aluminum, steel, plywood, balsa, teak, and/or a hardwood in various examples. First skin 16 and second skin 18 may be formed of the same material or materials in some systems 100, while in other examples first skin 16 and second skin 18 may be formed of different materials. Each of first skin 16 and second skin 18 may be formed of one or more layers of such material, such as of a laminate of one or more layers of one or more of the above materials. Thus, sandwich panel 12 may be a composite panel.

In various examples of systems 100 and related methods, first skin 16, second skin 18, and/or core 14 may be precision cut, such as via ultrasonic cutting. Contrary to conventional techniques, said precision cutting of the present disclosure may be performed before panel bonding, rather than after. In other words, first skin 16, second skin 18, and/or core 14 may be precision cut via ultrasonic cutting before the layers are bonded together to form sandwich panel 12. In some examples, ultrasonic cutting techniques may enable disclosed inserts 50 to be positioned before sandwich panel 12 is bonded together, and thus install inserts 50 as part of the layup of sandwich panel 12. Such improved methods can avoid post-processing routing steps and/or time-intensive potting compound curing steps associated with conventional installation of prior art inserts.

In examples of systems 100 including adhesive pack 66, said adhesive pack may be coupled to insert 50 and/or may be positioned within bore 20. For example, system 100 may include adhesive pack 66 positioned between main body 52 of insert 50 and core 14 of sandwich panel 12, such that adhesive pack 66 may conform to and/or surround at least a portion of main body 52 when insert 50 is positioned within bore 20. In some examples, system 100 may include adhesive pack 66 already positioned within bore 20 when insert 50 is installed within bore 20 (e.g., adhesive pack 66 may be configured to be placed in bore 20 of sandwich panel 12 before insert 50 is placed in bore 20). In various examples, adhesive pack 66 may be positioned adjacent first transverse face 72 of main body 52 of insert 50, adjacent exterior circumferential surface 76 of main body 52 of insert 50, and/or adjacent second transverse face 74 of main body 52 of insert 50. Adhesive pack 66 may be configured to cure during curing of sandwich panel 12 such that installation of insert 50 applies pressure on adhesive pack 66 when sandwich panel 12 and insert 50 are compressed together, thereby releasing adhesive from within adhesive pack 66 that may flow within bore 20 and around insert 50 to help bond insert 50 in place within bore 20. In some examples, adhesive pack 66 may be a 2-part epoxy adhesive pack 66. In some systems 100, a plurality of adhesive packs 66 may be used—for example, one or more respective adhesive packs 66 may be positioned within one or more of each of one or more respective bores 20 of sandwich panel 12.

Turning now to FIGS. 7-21, illustrative non-exclusive examples of inserts 50 (and/or systems 100 including the same) are illustrated. Where appropriate, the reference numerals from the schematic illustration of FIG. 5 are used to designate corresponding parts of FIGS. 7-21; however, the examples of FIGS. 7-21 are non-exclusive and do not limit inserts 50 to the illustrated embodiments of FIGS. 7-21 That is, inserts 50 are not limited to the specific embodiments illustrated in FIGS. 7-21, and may incorporate any number of the various aspects, configurations, characteristics, properties, etc. that are illustrated in and discussed with reference to the schematic representation of FIG. 5 and/or the embodiments of FIGS. 7-21, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 7-21; however, it is within the scope of the present disclosure that the previously discussed features, variants, etc. may be utilized therewith.

Figure 6:
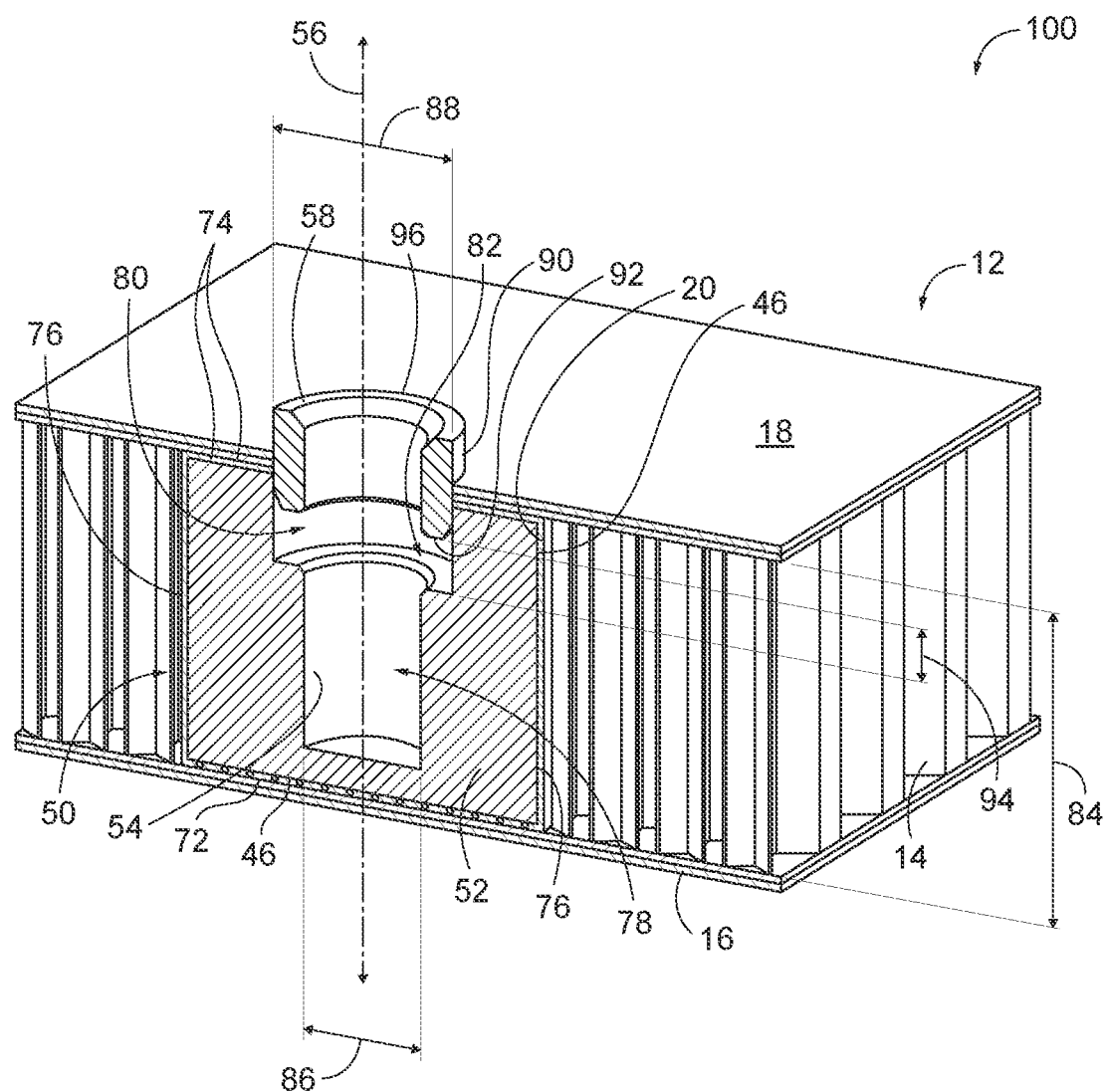
FIG. 6 is a perspective cutaway view of an example of a skin-bonded threaded insert according to the present disclosure installed within a bore of a sandwich panel, the insert having a collar shown in the raised position.
Figure 7:
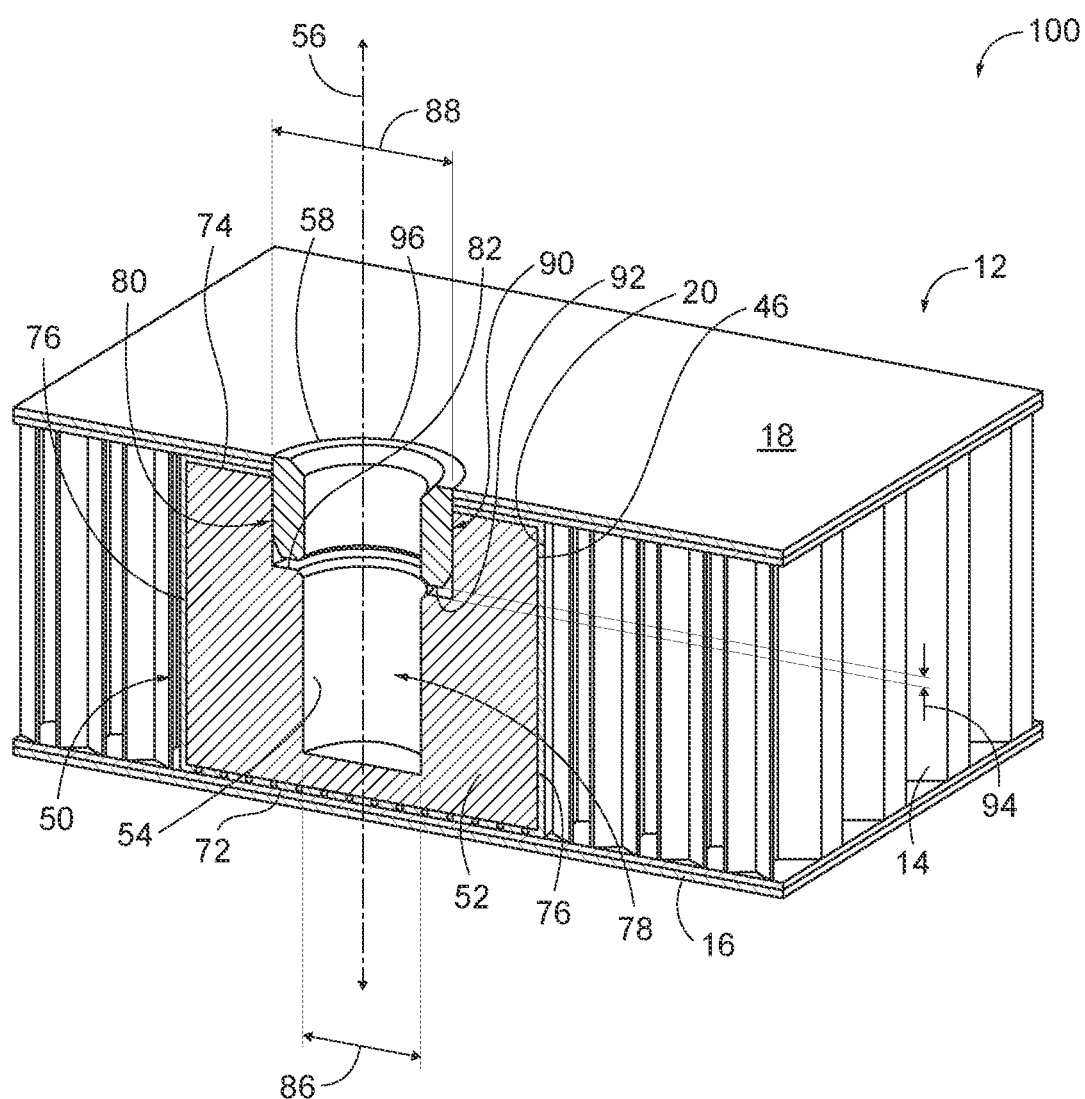
FIG. 7 is a perspective cutaway view of the skin-bonded threaded insert of FIG. 6, with the collar shown in the compressed position.

FIGS. 6-7 show an example of insert 50 installed in bore 20 of sandwich panel 12, shown in a cutaway view. In the example of FIGS. 6-7, main body 52 of insert 50 extends longitudinally (along longitudinal axis 56) through core 14, though in various other examples, main body 52 may extend longitudinally through only a portion of core 14, rather than through the entire thickness of core 14 as in this example.

Main body 52 of insert 50 extends longitudinally from a first transverse face 72 to a second transverse face 74. An exterior circumferential surface 76 of main body 52 engages core 14 when insert 50 is installed in bore 20 of sandwich panel 12. Hole 54 extends longitudinally through at least a portion of main body 52. In this example, hole 54 extends longitudinally from second transverse face 74 towards first transverse face 72, but does not extend all the way through main body 52. In other examples of insert 50, hole 54 may extend all the way through main body 52, or may extend from first transverse face 72 part-way to second transverse face 74.

In the examples of FIGS. 6-7, insert 50 includes a threaded portion 78 (though various examples of insert 50 may be unthreaded), a first enlarged portion 80, and a shelf 82 within hole 54. Threaded portion 78 may be threaded such that it is configured to engage a threaded portion of a fastener (e.g., fastener 48). Threaded portion 78 extends longitudinally along at least a portion of a length 84 of hole 54 in the longitudinal direction. As is understood in the art, threaded portion 78 may have a major diameter and a minor diameter, with the major diameter corresponding to a maximum diameter 86 of threaded portion 78. First enlarged portion 80 generally has a first enlarged diameter 88 that is greater than maximum diameter 86 of threaded portion 78. Shelf 82 is formed at a transition between first enlarged portion 80 and threaded portion 78. In other words, shelf 82 represents the change in diameter of hole 54 between maximum diameter 86 of threaded portion 78 and first enlarged diameter 88 of first enlarged portion 80. Other examples of inserts 50 may include a hole 54 without one or more of these features, however.

The example of insert 50 of FIGS. 6-7 also includes collar 58, which may be sized with respect to first enlarged portion 80 such that an external surface 90 of collar 58 has a friction fit or press fit with first enlarged portion 80. In this manner, collar 58 may be used for indexing and/or aligning components of sandwich panel 12 and/or insert 50 together. For example, second skin 18 may be indexed onto core 14 and first skin 16 via collar 58, because insert 50 may be positioned within bore 20 of sandwich panel 12 before second skin 18 is placed onto core 14 (e.g., before sandwich panel 12 is fully assembled), in some examples. Additionally or alternatively, collar 58 may be configured to secure or maintain insert 50 in place within a precision cut hole in the skin of sandwich panel 12 while sandwich panel 12 is cured with insert 50 in place.

Collar 58 is configured to be longitudinally translated with respect to main body 52, to transition collar 58 between a raised position (FIG. 6) and a compressed position (FIG. 7). Such longitudinal translation may occur during installation of insert 50 into sandwich panel 12. In some examples, sandwich panel 12 is compressed once insert 50 is positioned within bore 20 to cure and secure the layers of sandwich panel 12 together, and which also compresses insert 50 such that collar 58 is longitudinally translated towards the center of core 14. In other words, collar 58 may be configured to be transitioned to the compressed position when sandwich panel 12 is compressed, such that sandwich panel 12 and insert 50 are compressed together.

In some examples, and as shown in FIG. 6, in the raised position, a lower surface 92 of collar 58 is positioned such that it is facing and spaced apart from shelf 82. Lower surface 92 is spaced apart from shelf 82 by a collar displacement distance 94. In the compressed position of FIG. 7, lower surface 92 of collar 58 is closer to shelf 82 than in the raised position. In some examples, lower surface 92 may contact, be pressed against, or engage with, shelf 82 in the compressed position. Additionally or alternatively, collar displacement distance 94 is smaller in the compressed position than in the raised position. In some examples, external surface 90 of collar 58 is threaded. Additionally or alternatively, collar 58 may be internally threaded. In some examples, collar 58 may be configured to act as a thread lock for locking insert 50 in place within sandwich panel 12.

An upper surface 96 of collar 58 may be at least substantially flush with second skin 18 (or subflush thereto) when collar 58 is in the compressed position (FIG. 7), with upper surface 96 of collar 58 being opposite lower surface 92 of collar 58. On the other hand, in the raised position (FIG. 6), upper surface 96 of collar 58 may sit proud of second skin 18, such that upper surface 96 and at least a portion of collar 58 protrudes beyond the surface of second skin 18. Collar 58 may be countersunk adjacent upper surface 96, such as to facilitate engagement with a fastener (e.g., secondary object 48).

As shown in FIGS. 6-7, some examples of insert 50 may be inserted within sandwich panel 12 such that first transverse face 72 of main body 52 of insert 50 engages with first skin 16. For example, first transverse face 72 may contact, be coupled to, and/or be positioned adjacent first skin 16, such as first inner skin surface 101 of first skin 16 that faces core 14. Similarly, second transverse face 74 may contact, be coupled to, and/or be positioned adjacent second skin 18, such as second inner skin surface 104 of second skin 18 that faces core 14. Thus, in this example, insert 50 extends longitudinally along at least substantially the entire thickness of core 14 because it at least substantially extends from first skin 16 to second skin 18. In other examples, insert 50 may extend longitudinally through just a portion of the thickness of core 14, such that first transverse face 72 and/or second transverse face 74 is engaged with core 14 rather than a respective skin 16, 18. First transverse face 72, second transverse face 74, and exterior circumferential surface 76 is each said to engage with the respective portion of sandwich panel 12 even if coating 46 is present on one or more of these surfaces. In other words, first transverse face 72, second transverse face 74, and exterior circumferential surface 76 may be engaged with the respective portions of sandwich panel 12, as the term is used herein, even if not in direct physical contact with the respective portion of sandwich panel 12, such as due to intervening coating 46.

The examples of FIGS. 6-7 include coating 46 on first transverse face 72, second transverse face 74, and exterior circumferential surface 76 of main body 52, though in some examples, just a subset of these surfaces, and/or just a portion of one or more of these surfaces may include coating 46. In some examples, at least a portion of collar 58 (e.g., external surface 90 of collar 58, lower surface 92 of collar 58, and/or upper surface 96 of collar 58) may include coating 46. For example, collar 58 may be configured to be positioned within first enlarged portion 80 of hole 54 at the time when insert 50 is coated with coating 46 such that coating 46 may be applied to at least a portion of collar 58 as well. In some examples, coating 46 may be applied to at least a portion of collar 58 before collar 58 is positioned with first enlarged portion 80 of insert 50.

Figure 8:
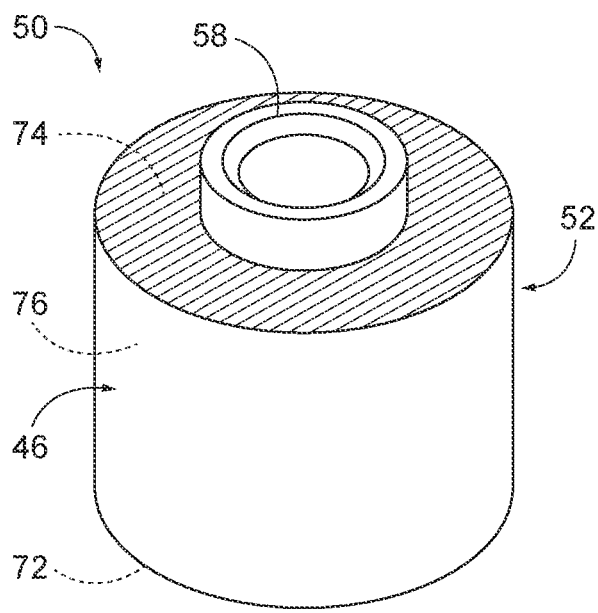
FIG. 8 is a perspective view of an example of a skin-bonded threaded insert according to the present disclosure.
Figure 9:
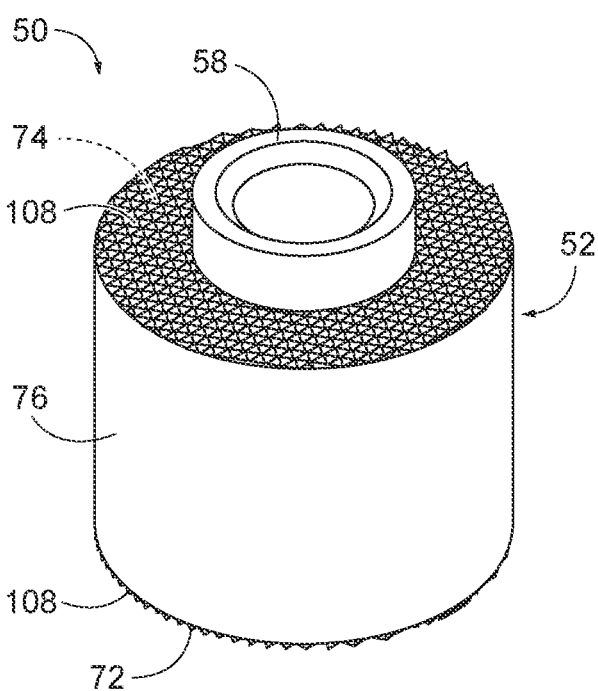
FIG. 9 is a perspective view of an example of a skin-bonded threaded insert according to the present disclosure.

FIG. 8 shows a perspective view of an example of insert 50, shown apart from any sandwich panel, with collar 58 in the raised position. In this example, first transverse face 72, second transverse face 74, and exterior circumferential surface 76 of main body 52 are all coated with coating 46. Coating 46 is not shown on collar 58, though in some examples, at least a portion of collar 58 may include coating 46. FIG. 9 shows another example of insert 50 with collar 58 in the raised position. In this example, first transverse face 72 and second transverse face 74 of main body 52 include knurling 108. In other examples, exterior circumferential surface 76 additionally or alternatively may include knurling 108, and/or at least a portion of collar 58 may include knurling 108 in some examples.

Figure 10:
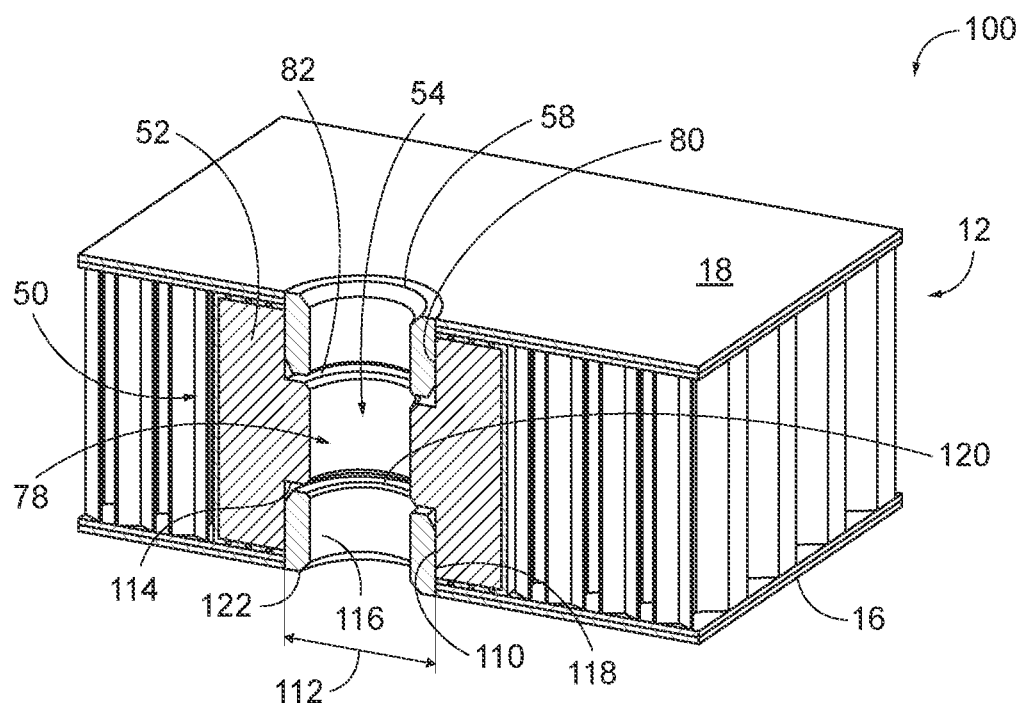
FIG. 10 is a perspective cutaway view of an example of a skin-bonded threaded insert according to the present disclosure, installed within a bore of a sandwich panel.

FIG. 10 shows a perspective cutaway view of another example of insert 50, inserted within bore 20 of sandwich panel 12. Similar to the insert 50 illustrated in FIGS. 6-7, this example of insert 50 includes collar 58, and first enlarged portion 80 formed within main body 52. Additionally, this example of insert 50 includes a second enlarged portion 110 within hole 54. Second enlarged portion 110 has a second enlarged diameter 112 that is greater than maximum diameter 86 of hole 54 (FIG. 6). In some examples, second enlarged diameter 112 may be at least substantially equal to first enlarged diameter 88 (FIG. 6) of first enlarged portion 80. In other examples, second enlarged diameter 112 is smaller or larger than first enlarged diameter 88. Hole 54 also includes a second shelf 114 in this example, which is formed at the transition between second enlarged portion 110 and threaded portion 78 of hole 54.

This example of insert 50 further includes a second collar 116 that is sized with respect to second enlarged portion 110 of hole 54 such that a second external surface 118 of second collar 116 has a friction fit with second enlarged portion 110. Thus similar to collar 58 (which may be referred to as first collar 58), second collar 116 may be configured to be transitioned between a second raised position and a second compressed position during installation of insert 50 in sandwich panel 12. In the second raised position, a second lower surface 120 of second collar 116 is positioned such that it is spaced apart from second shelf 114, and in the second compressed position (which is shown in FIG. 10), second lower surface 120 of second collar 116 is nearer to second shelf 114 than in the second raised position. For example, second lower surface 120 may be engaged with, pressed against, coupled to, and/or adjacent second shelf 114 of hole 54 when second collar 116 is in the second compressed position. Second collar 116 may be configured to be transitioned to the second compressed position when sandwich panel 12 is compressed, such that sandwich panel 12 and insert 50 (including collar 58 and second collar 116) are compressed together. In some examples, a second upper surface 122 of second collar 116 is at least substantially flush with (or subflush to) first skin 16 when second collar 116 is in the compressed position, as shown in FIG. 10. Second upper surface 122 may sit proud of first skin 16 when second collar 116 is in the raised position.

Second collar 116 may be configured to be positioned within second enlarged portion 110 when insert 50 is coated with any coating 46 deposited on, adhered to, and/or applied to insert 50. In some examples, coating 46 may be applied to second external surface 118, second lower surface 120, and/or a second upper surface 122 of second collar 116. Additionally or alternatively, second external surface 118, second lower surface 120, and/or second upper surface 122 of second collar 116 may be knurled. Additionally or alternatively, as with first collar 58, second collar 116 may include threads, such as by being threaded on second external surface 118 and/or being internally threaded.

Figure 11:
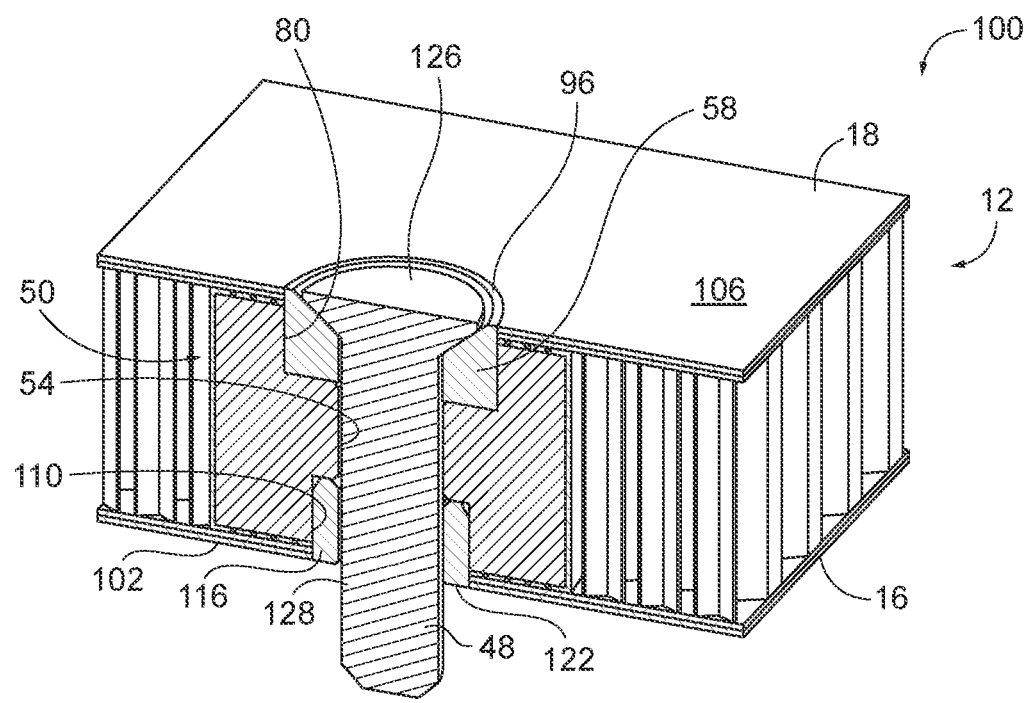
FIG. 11 is a perspective cutaway view of an example of a skin-bonded threaded insert according to the present disclosure, installed within a bore of a sandwich panel and including a fastener positioned therethrough.

FIG. 11 illustrates another example of insert 50 positioned within sandwich panel 12. In this example, hole 54 includes first enlarged portion 80 and second enlarged portion 110, and insert 50 includes first collar 58 and second collar 116. Further, as shown in the example of FIG. 11, second enlarged portion 110 may have a smaller diameter than the diameter of first enlarged portion 80, though the diameter of second enlarged portion 110 is still greater than the diameter of hole 54 (which may be unthreaded). Insert 50 is shown in the compressed position in FIG. 11, with upper surface 96 of collar 58 being at least substantially flush with second skin 18 (e.g., with second outer skin surface 106), and second upper surface 122 of second collar 116 at least substantially flush with first skin 16 (e.g., with first outer skin surface 102). The example of insert 50 in FIG. 11 also includes secondary object 48, in the form of a fastener 48 being inserted through hole 54 of insert 50. As shown, a head 126 of fastener 48 may be engaged with collar 58, while a shaft 128 of fastener 48 may be engaged with hole 54 (e.g., threaded portion 78 of hole 54, if hole 54 is threaded, or simply positioned to extend through hole 54) and/or with second collar 116 (and/or with floating threaded nut 64, as shown in FIG. 12).

Figure 12:
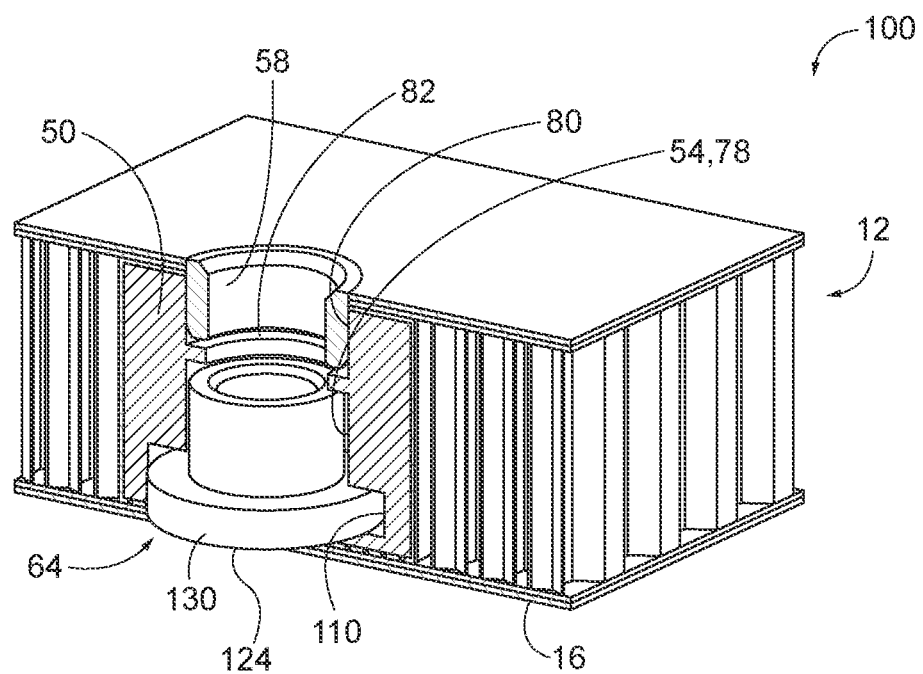
FIG. 12 is a perspective cutaway view of an example of a skin-bonded threaded insert according to the present disclosure, installed within a bore of a sandwich panel.

FIG. 12 illustrates another example of insert 50 that includes first enlarged portion 80 with collar 58 positioned therein, and second enlarged portion 110. In this example, a portion of floating threaded nut 64 is positioned within threaded portion 78 of hole 54, while a flange 130 of floating threaded nut 64 is positioned within second enlarged portion 110. In this manner, a portion of hole 54 is said to be sized and shaped to accommodate and contain floating threaded nut 64. A lower nut surface 124 of floating threaded nut 64 may be at least substantially flush with, positioned adjacent, and/or engaged with insert 50, such that floating threaded nut 64 may be contained within insert 50.

Figure 13:
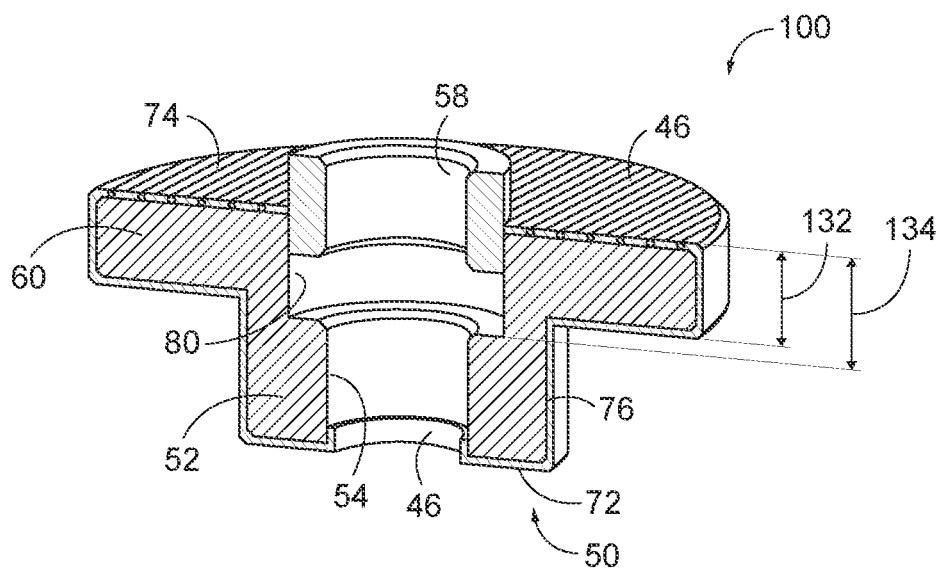
FIG. 13 is a perspective cutaway view of an example of a skin-bonded threaded insert according to the present disclosure.
Figure 14:
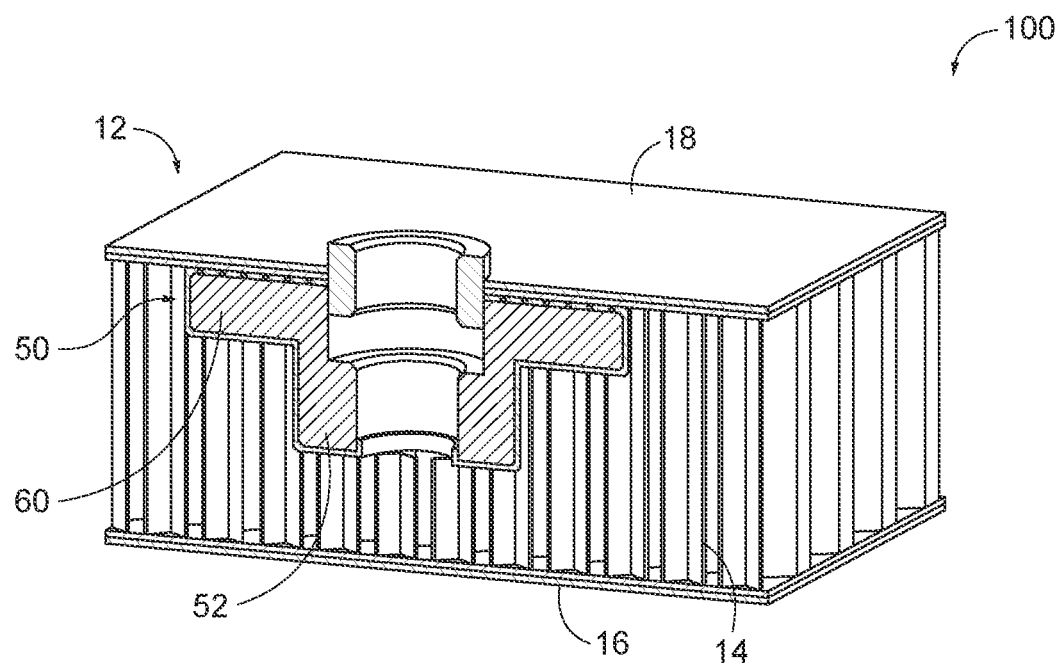
FIG. 14 is a perspective cutaway view of an example of a skin-bonded threaded insert according to the present disclosure, installed within a bore of a sandwich panel.
Figure 15:
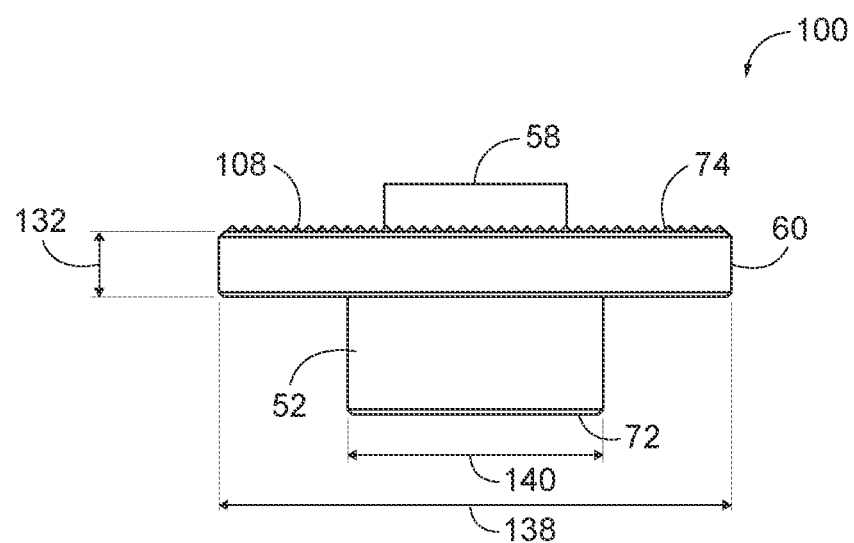
FIG. 15 is a side elevation view of an example of a skin-bonded threaded insert according to the present disclosure.
Figure 16:
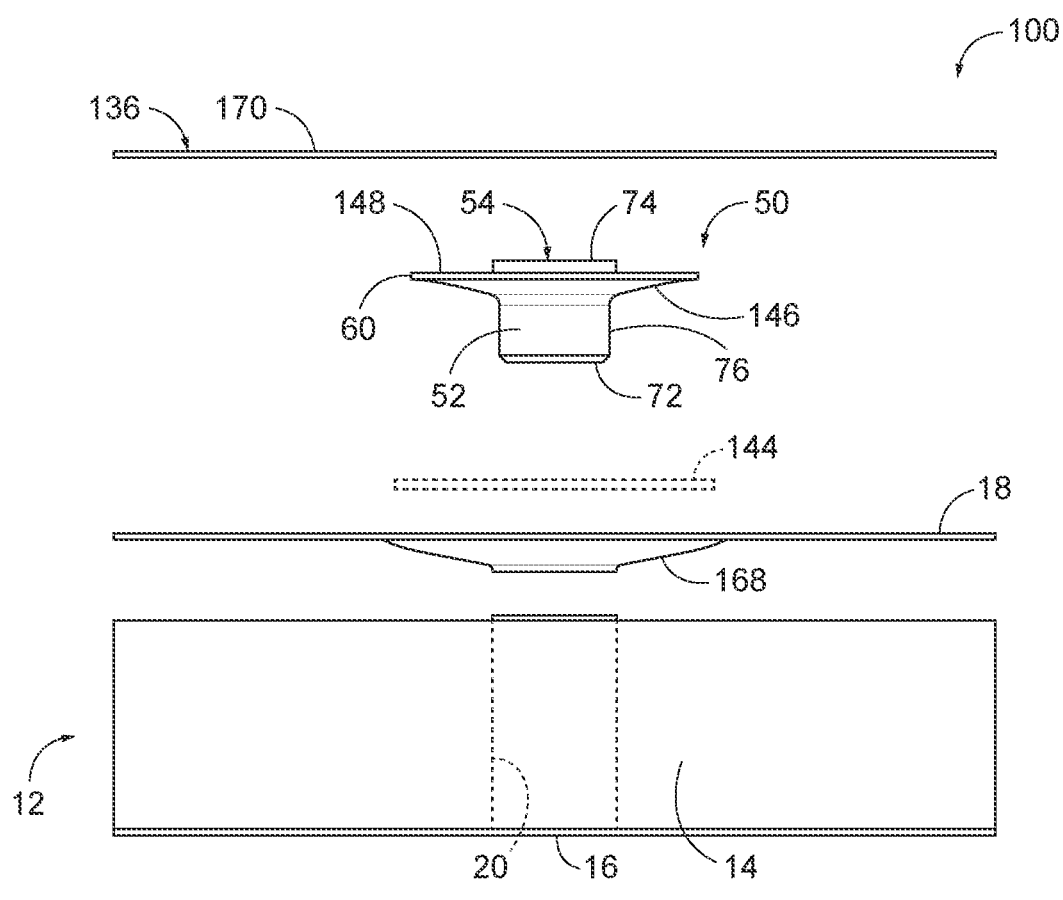
FIG. 16 is a partially exploded, side elevation view of an example of a presently disclosed system including a skin-bonded threaded insert of the present disclosure.
Figure 17:
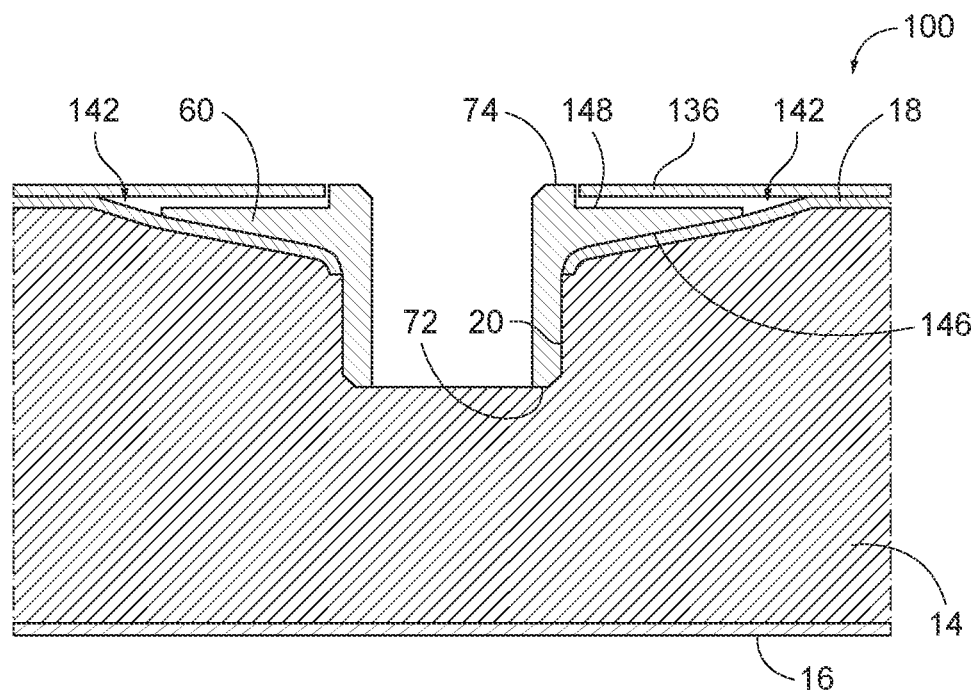
FIG. 17 is a cross-sectional view of an example of a skin-bonded threaded insert according to the present disclosure, installed within a bore of a sandwich panel.

FIGS. 13-17 illustrate examples of inserts 50 that include enlarged flange 60 that projects, or protrudes, radially outward from main body 52 (e.g., from exterior circumferential surface 76 of main body 52) of insert 50. Enlarged flange 60 may be positioned anywhere along the length of main body 52 (e.g., along longitudinal axis 56) in various examples of insert 50. In some examples, enlarged flange 60 may be positioned at or near second transverse surface 74 of main body 52. In the examples of FIGS. 13-15, enlarged flange 60 defines second transverse face 74. Similarly, in some examples, enlarged flange 60 may be positioned at or near first transverse face 72 of main body 52, and may define first transverse face 72. In various other examples, enlarged flange 60 may be positioned between first transverse face 72 and second transverse face 74, such that enlarged flange 60 is longitudinally offset from both first transverse face 72 and second transverse face, such as shown in the examples of FIGS. 16-17. Some examples of insert 50 may include two or more flanges 60 projecting radially outward from exterior circumferential surface 76, while some examples of insert 50 include just one enlarged flange 60. Enlarged flange 60 may have a flange thickness 132 that is less than, greater than, or substantially equal to a second thickness 134 of first enlarged portion 80. In some examples, flange thickness 132 is at least 30%, at least 40%, at least 50%, at least 60%, at least 70%, and/or at least 80% of second thickness 134 of first enlarged portion 80.

As with other examples of insert 50, various examples of insert 50 that include enlarged flange 60 may include coating 46 (FIG. 13) and/or knurling 108 (FIG. 15) on one or more surfaces of main body 52 and/or collar 58. As shown in FIG. 14, in some examples, main body 52 may be sized relative to sandwich panel 12 that it does not extend all the way through core 14, from first skin 16 to second skin 18. For example, enlarged flange 60 is positioned to engage core 14 and second skin 18 in FIG. 14. In other examples, enlarged flange 60 may be positioned to engage core 14 and first skin 16. As best seen in FIG. 15, a flange diameter 138 of enlarged flange 60 is greater than a body diameter 140 of main body 52. In various examples, flange diameter 138 may be substantially constant along flange thickness 132, or flange diameter 138 maybe variable along flange thickness 132, such as in the case of a tapered or beveled enlarged flange 60.

In some examples, and as shown partially exploded in FIG. 16 and assembled in FIG. 17, enlarged flange 60 may be configured to be sandwiched between two skins of sandwich panel 12. In this example of system 100, sandwich panel 12 includes first skin 16, core 14, second skin 18 opposite first skin 16, and a third outer skin 136. Second skin 18 is sandwiched between third outer skin 136 and core 14. When sandwich panel 12 is assembled and insert 50 is positioned within bore 20 of sandwich panel 12 (FIG. 17), enlarged flange 60 may be positioned interiorly to third outer skin 136 (e.g., between third outer skin 136 and core 14), such as being positioned between second skin 18 and third outer skin 136, as shown. In other examples, enlarged flange 60 may be positioned interiorly to both third outer skin 136 and second skin 18, such that enlarged flange 60 is positioned between second skin 18 and first skin 16. Insert 50 in these examples thus is bonded under third outer skin 136, and is retained within bore 20 due to co-bonding to second skin 18 and/or third outer skin 136, rather than via potting compound placed in bore 20. As best seen in FIG. 17, first transverse face 72 may be engaged with core 14, such that main body 52 does not extend all the way through the thickness of sandwich panel 12, though in other examples, insert 50 may extend through the thickness of core 14. Exterior circumferential surface 76 is generally engaged with core 14 when insert 50 is installed in sandwich panel 12. Second transverse face 74 may extend beyond third outer skin 136, or may be substantially flush with third outer skin 136, which may provide a smaller interface to install a fastener than if the entire enlarged flange 60 was visible.

As with other examples of insert 50, a coating, such as a thermoset resin coating (e.g., coating 46) may be present on at least a portion of insert 50, such as on second transverse face 74, first transverse face 72, and/or enlarged flange 60. Additionally or alternatively, a resin or adhesive may be added to edges of enlarged flange 60, such as to fill in any gaps 142 between enlarged flange 60 and skins 136, 18. In some examples, a donut 144 pre-impregnated with thermoset resin may be positioned to circumscribe main body 52, with donut 144 being configured to bond insert 50 in place within bore 20 of sandwich panel 12. Donut 144 may extend radially outward from main body 52, along an underside 146 of enlarged flange 60. For example, donut 144 may extend to cover at least 75% of underside 146 of enlarged flange 60. Using coating 46, donut 144, resin impregnated in skins 18, 136, and/or other applied or injected or inserted adhesive or resin, insert 50 may be bonded to second skin 18 and third outer skin 136 when sandwich panel 12 is cured.

In some examples, underside 146 of enlarged flange 60 is beveled, such as shown in FIGS. 16-17. Said underside 146 is generally engaged with second skin 18, though underside 146 may be engaged with other components of sandwich panel 12 in various examples of insert 50. An upper side 148 of enlarged flange 60 (opposite underside 146) may engage third outer skin 136, as best seen in FIG. 17. Upper side 148 may be at least substantially parallel to second transverse face 74 and/or at least substantially perpendicular to the longitudinal axis of main body 52.

In some examples, second skin 18 includes a depression 168 that corresponds with underside 146 of enlarged flange 60, such that enlarged flange 60 is configured to be seated within depression 168 when insert 50 is installed within sandwich panel 12 and the components are compressed together. In some examples, said depression 168 may be pre-formed in second skin 18. In some examples, depression 168 may be formed during compression and curing of sandwich panel 12. Compression of insert 50 within bore 20 of sandwich panel 12 may result in second transverse face 74 of insert 50 being engaged with and/or at least substantially flush with third outer skin 136 (e.g., an outer surface 170 of third outer skin 136).

Figure 18:
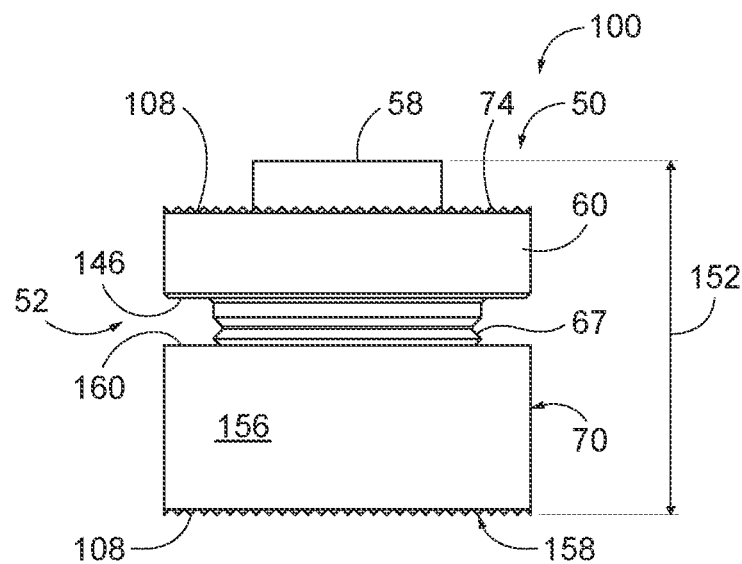
FIG. 18 is a side elevation view of an example of a skin-bonded threaded insert having a second insert part, according to the present disclosure.
Figure 19:
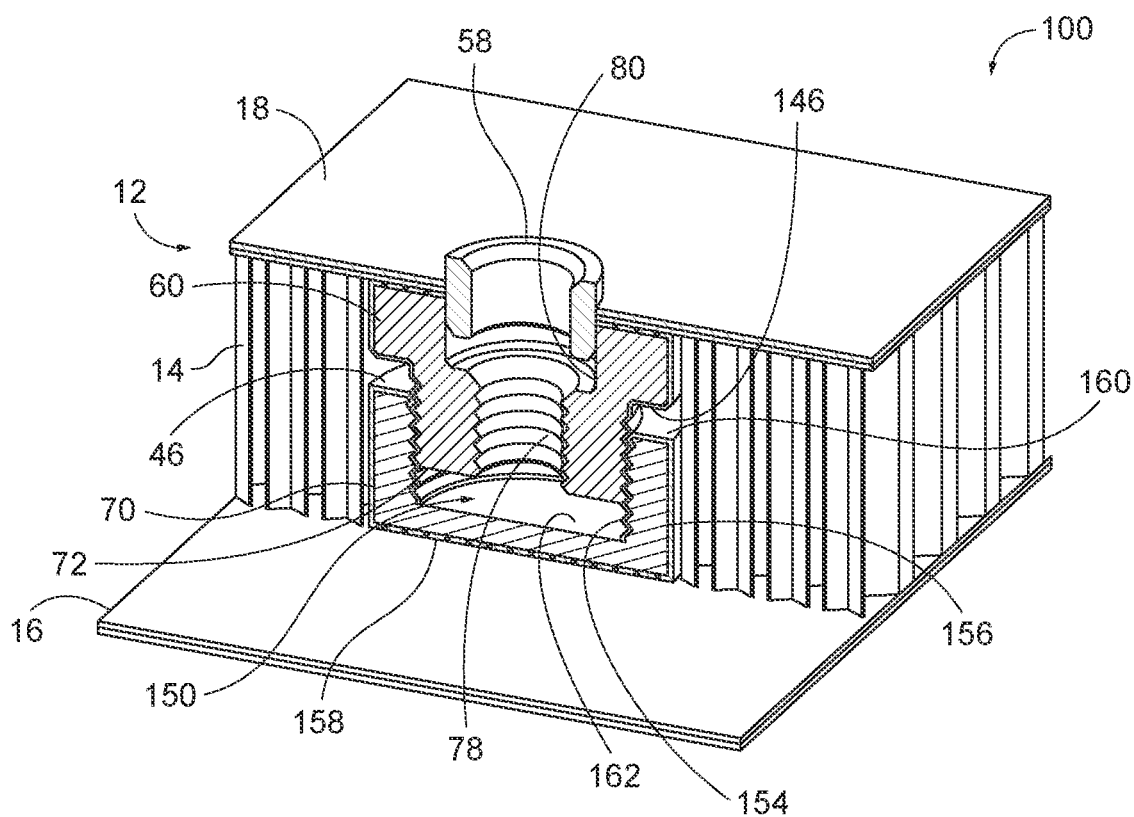
FIG. 19 is a perspective cutaway view of a skin-bonded threaded insert according to the present disclosure, installed within a bore of a sandwich panel.

Turning now to FIGS. 18-19, examples of insert 50 including second insert part 70 are shown in a side elevation view (FIG. 18) and in a perspective cutaway view, with insert 50 being positioned within sandwich panel 12 (FIG. 19). In these examples, second insert part 70 is configured to engage with main body 52 of insert 50 such that at least a portion of main body 52 is positioned within a receiving volume 150 of second insert part 70. Such engagement between main body 52 and second insert part 70 is selectively adjustable to adjust an overall height 152 of insert 50 (e.g., overall height 152 corresponds to the overall height of main body 52 and second insert part 70 when the two are engaged together). For example, external threads 67 in exterior circumferential surface 76 of main body 52 may be configured to engage with internal threads 154 within receiving volume 150 of second insert part 70 to adjust the position of main body 52 with respect to second insert part 70 along the longitudinal axis of insert 50. In other words, external threads 67 and internal threads 154 of second insert part 70 may allow for selective longitudinal translation of main body 52 with respect to second insert part 70. In some examples, enlarged flange 60 may be configured to serve as a stop to limit translation of main body 52 with respect to second insert part 70, such that overall height 152 is at a minimum when second insert part 70 contacts enlarged flange 60. Additionally or alternatively, an internal face 162 within receiving volume 150 of second insert part 70 may serve as a stop to limit translation of main body 52 with respect to second insert part 70, as main body 52 will substantially not be longitudinally translated further into receiving volume 150 once first transverse face 72 of main body 52 engages, or contacts, internal face 162 of second insert part 70. In other words, internal face 162 may be configured to limit longitudinal translation of main body 52 with respect to second insert part 70, such as when sandwich panel 12 and insert 50 are compressed, with insert 50 being positioned within bore 20 of sandwich panel 12.

Second insert part 70 includes a second exterior circumferential surface 156 that is configured to engage core 14 of sandwich panel 12. Second insert part 70 also includes a panel-engaging transverse surface 158, which generally is configured to engage first skin 16 or second skin 18, though may engage core 14 in some examples. In the example shown in FIG. 19, panel-engaging transverse surface 158 is illustrated engaged with first skin 16. Second insert part 70 also includes an insert-facing transverse surface 160 opposite panel-engaging transverse surface 158. In some examples, insert-facing transverse surface 160 may contact or engage with main body 52 (e.g., with enlarged flange 60 of main body 52) when overall height 152 is minimized, though there will generally be a space between insert-facing transverse surface 160 and enlarged flange 60 (or other aspect or feature of main body 52). Insert-facing transverse surface 160 generally faces a portion of main body 52, such as facing underside 146 of enlarged flange 60, as shown in FIGS. 18-19.

FIG. 18 illustrates an example of insert 50 with knurling 108 on second transverse face 74 of main body 52 and panel-engaging transverse surface 158 of second insert part 70, while FIG. 19 illustrates an example of insert 50 with coating 46 on second insert part 70 and main body 52, though variations are also within the scope of the present disclosure. The example of FIG. 19 includes coating 46 on second exterior circumferential surface 156, panel-engaging transverse surface 158, insert-facing transverse surface 160, and internal threads 154, though other examples may include coating 46 on fewer of these surfaces, and/or on just a portion of one or more of these surfaces.

In some examples, second insert part 70 is configured to engage with main body 52 such that compression of sandwich panel 12 (e.g., when first skin 16, core 14, and second skin 18 are compressed together to form sandwich panel 12) causes longitudinal translation of main body 52 with respect to second insert part 70, thereby reducing overall height 152. For example, external threads 67 of main body 52 and internal threads 154 of second insert part 70 may be sized and shaped with respect to each other such that main body 52 is configured to be ratcheted past internal threads 154 when sandwich panel 12 and insert 50 are compressed with sufficient force, thereby longitudinally translating main body 52 with respect to second insert part 70 and reducing overall height 152.

Figure 20:
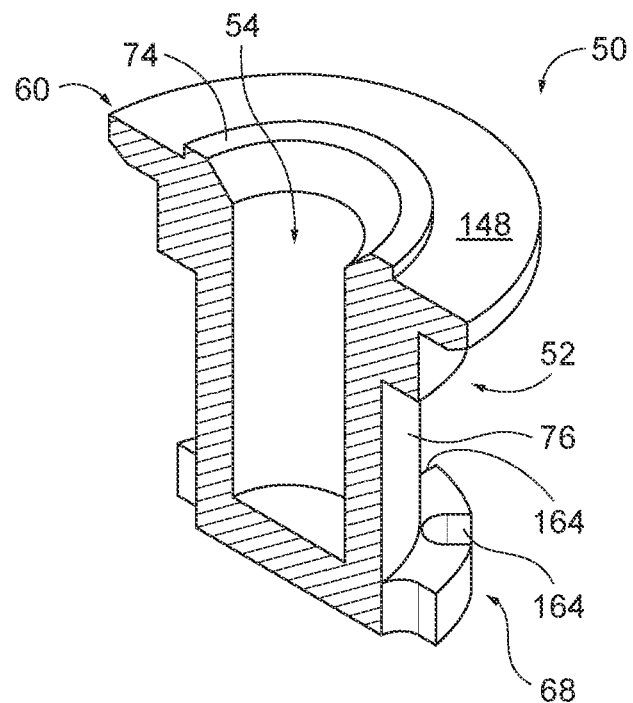
FIG. 20 is a perspective cutaway view of an example of a skin-bonded threaded insert according to the present disclosure.
Figure 21:
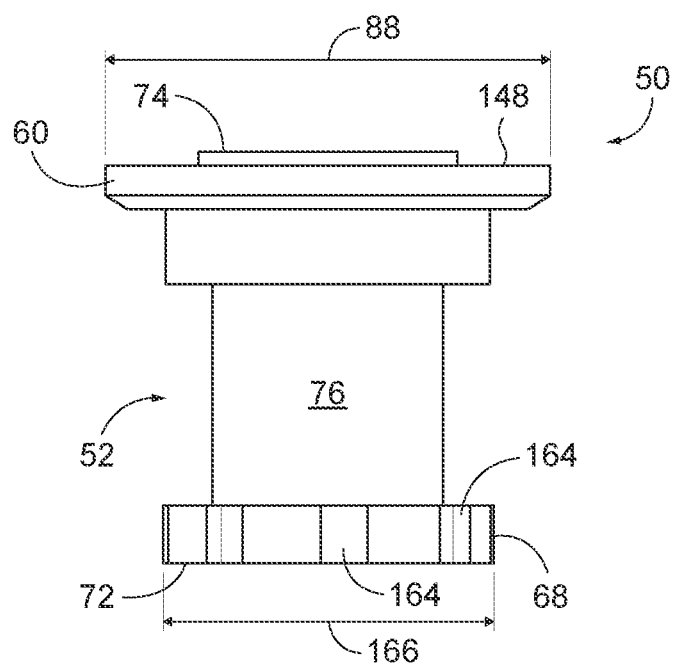
FIG. 21 is a side elevation view of the skin-bonded threaded insert of FIG. 20.

FIGS. 20-21 illustrate an example of insert 50 having notched flange 68 and enlarged flange 60. Enlarged flange 60 is positioned adjacent second transverse face 74 of main body 52 in this example, but does not define, or form, second transverse face 74 in this example. As shown in these figures, enlarged flange 60 may be a stepped two-diameter enlarged flange 60, which may be configured to impart increased strength to enlarged flange 60 and/or insert 50 as a whole. Notched flange 68 forms first transverse face 72 in this example, though in other examples notched flange 68 may be near to (e.g., adjacent) first transverse face 72, or may be positioned elsewhere along the length of insert 50. Notched flange 68 includes a plurality of notches 164. Each notch 164 may be configured to receive an adhesive to bond insert 50 in place within a bore of a sandwich panel. In some examples, such adhesive or resin may be configured to flow through said notches 164 to secure insert 50 in place within the bore of a sandwich panel. As best seen in FIG. 21, a notched flange diameter 166 of notched flange 68 may be less than first enlarged diameter 88 of enlarged flange 60 in some examples. In other examples, notched flange diameter 166 may be at least substantially equal to first enlarged diameter 88, or may be greater than first enlarged diameter 88.

While the example of FIGS. 20-21 is shown without a collar 58, said collar 58 may be included with the example of insert 50 shown in FIGS. 20-21, or variations thereof. Similarly, while the example of FIGS. 20-21 does not include any knurling 108 or coating 46 as illustrated, other examples that include notched flange 68 also may include knurling 108 and/or coating 46 on one or more surfaces of insert 50. In a specific example, a coating or resin is applied to upper side 148 of enlarged flange 60. Hole 54 of this example of insert 50 is illustrated as being a blind hole 54 that does not extend through the entire insert, though in other examples, hole 54 may extend through the entire insert 50, including through notched flange 68. Hole 54 also may include internal threads (e.g., threaded portion 78). Insert 50 of FIGS. 20-21 is illustrated as being a singular, monolithic body, though in various examples may be formed or two or more bodies joined together.

Figure 22:
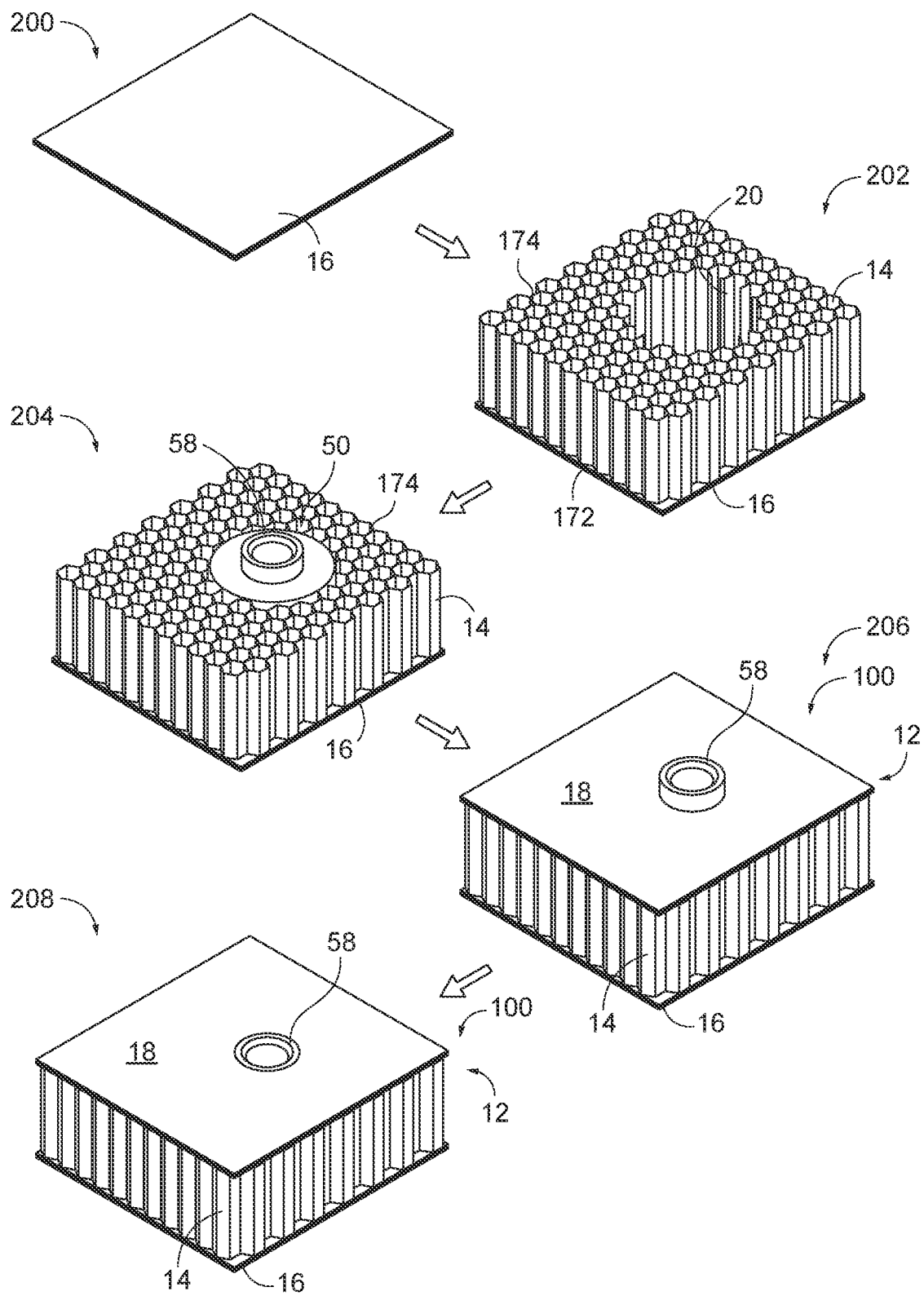
FIG. 22 is a graphical flow representation of an example of methods of installing a skin-bonded threaded insert within a bore of a sandwich panel.

FIG. 22 is a graphical process flow representation of illustrative, non-exclusive examples of methods according to the present disclosure. In FIG. 22, first skin 16 of sandwich panel 12 is prepared at 200, such as by being precision cut and positioned for assembly. Core 14 is then precision cut and indexed to first skin 16, at 202, such that core 14 is positioned such that a first side 172 of core 14 faces and engages with first skin 16. Insert 50 is then placed within bore 20 of sandwich panel 12, at 204. Insert 50 (e.g., collar 58) will generally protrude beyond a second side 174 of core 14 that is opposite first side 172. Second skin 18 is precision cut and indexed and positioned on core 14, at 206, such that second skin 18 engages second side 174 of core 14. At this stage, collar 58 of insert 50 is in the raised position such that it sits proud of second side 174 of core 14 and second skin 18. Sandwich panel 12 is compressed and cured at 208, which presses collar 58 into the compressed position such that it is flush with second skin 18. In this manner, components of sandwich panel 12 (e.g., first skin 16, core 14, and second skin 18) and insert 50 are all bonded together, without the need to cure the insert in place with potting compound beforehand. In conventional techniques, the sandwich panel components are bonded together first, then the panel and any holes/bores are cut in the panel, and then the inserts are installed and cured with potting compound. Thus, presently disclosed techniques and methods can improve process and flow efficiencies as compared to traditional techniques.

Figure 23:
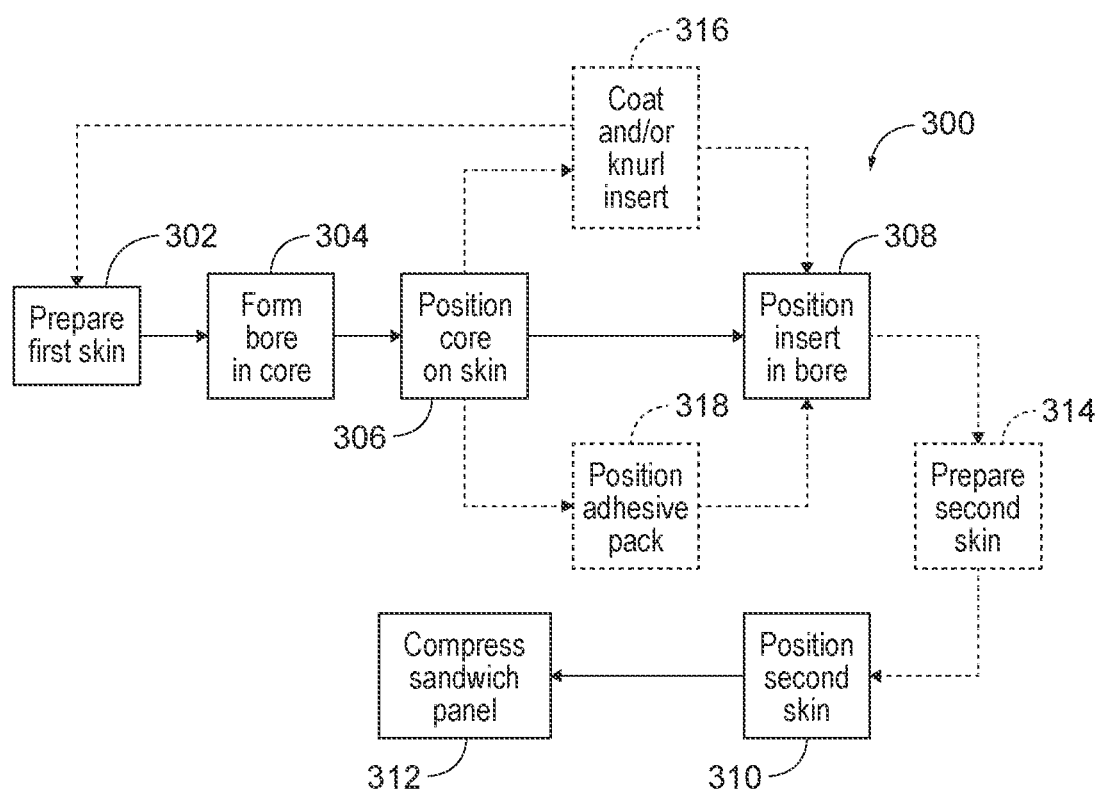
FIG. 23 is a schematic flow chart diagram, representing methods of installing a presently disclosed skin-bonded threaded insert within a sandwich panel, according to the present disclosure.
Figure 24:
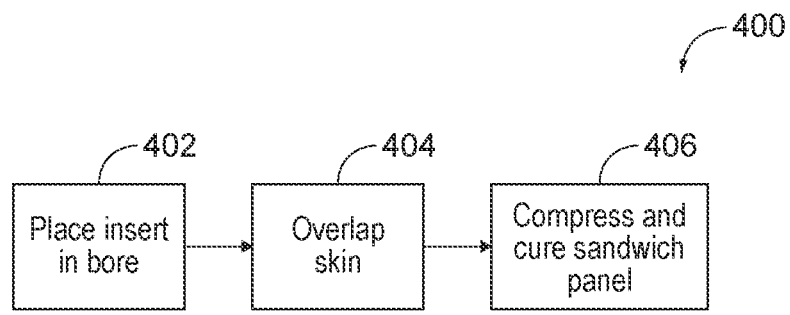
FIG. 24 is a schematic flow chart diagram, representing methods of installing a presently disclosed skin-bonded threaded insert within a sandwich panel, according to the present disclosure.

FIGS. 23-24 schematically provide flowcharts representing illustrative, non-exclusive examples of methods according to the present disclosure. In FIGS. 23-24, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 23-24 are not limiting and other methods and steps are within the scope of the present disclosure, including methods having greater than or fewer than the number of steps illustrated, as understood from the discussions herein.

FIG. 23 illustrates methods 300 of installing a skin-bonded threaded insert (e.g., insert 50) into a sandwich panel (e.g., sandwich panel 12). In said methods 300, a first skin of the sandwich panel (e.g., first skin 16) may be prepared at 302, which may include precision cutting the first skin, ultrasonic cutting the first skin, shaping the first skin, and/or drilling one or more holes through the first skin. A bore may be formed in a core (e.g., bore 20 in core 14) at 304, which may be performed before or after the core is positioned on the first skin at 306. In other words, the bore may be formed in the core at 304 before the core is secured to is positioned on or indexed to either skin. In some examples, forming the bore at 304 includes precision cutting the core. The core of the sandwich panel may be positioned on the first skin at 306, such that a first face of the core faces the first skin. The insert may be inserted at least partially into, or positioned at least partially within, the bore at 308. For example, at least a portion of a main body of the insert (e.g., main body 52) may be positioned within the bore of the sandwich panel, and a collar of the insert (e.g., collar 58) may sit proud of a second face of the core that is opposite the first face of the core facing the first skin. A second skin of the sandwich panel (e.g., second skin 18) may be positioned onto the second face of the core at 310, such that the collar extends through a through-hole in the second skin (e.g., through-hole 54) and sits proud of the second skin. The first skin, core, and second skin are compressed together at 312, with the insert positioned at least partially within bore 20, which causes the collar to be longitudinally translated with respect to the main body, to transition the collar between a raised position and a compressed position. Compressing the sandwich panel and the insert at 312 also includes curing the sandwich panel and the insert in place within the bore of the sandwich panel. The insert may thereby be bonded within the sandwich panel without needing to use potting compound.

In some examples, compressing the sandwich panel at 312 causes a lower surface of the collar to move closer to and/or contact a shelf within an enlarged portion of the main body of the insert. Such longitudinal translation of the collar during compressing the sandwich panel at 312 also may result in the upper surface of the collar being at least substantially flush with the second skin after the compressing, due to the longitudinal translation of the collar.

Methods 300 also may include preparing the second skin at 314, which may include precision cutting the second skin, ultrasonic cutting the second skin, shaping the second skin, and/or drilling one or more holes through the second skin. Some methods 300 also include coating at least a portion of the insert (e.g., with a thermoset resin) and/or knurling at least a portion of the insert at 316, before the insert is positioned within the bore at 308.

In some methods 300, an adhesive pack configured to cure during curing of the sandwich panel (e.g., adhesive pack 66) may be positioned within the bore of the sandwich panel at 318, typically before the insert is positioned within the bore at 308. For example, positioning the adhesive pack at 318 may include positioning said adhesive pack between the main body of the insert and the core, within the bore of the sandwich panel. In some examples, positioning the adhesive pack at 318 includes positioning an adhesive pack adjacent the first transverse face of the insert, positioning an adhesive pack adjacent the exterior circumferential surface of the main body of the insert, and/or positioning an adhesive pack in the bore of the sandwich panel.

Turning now to FIG. 24, methods 400 of installing an insert within a sandwich panel may include placing an insert (e.g., insert 50) at least partially within a bore of a sandwich panel that extends into or through at least a portion of the core, at 402. An enlarged flange of the insert (e.g., enlarged flange 60) may be overlapped with the second skin and/or a third outer skin of the sandwich panel, at 404. And finally, the sandwich panel and insert may be compressed and cured together at 406, thereby bonding the insert to the second skin and the third outer skin of the sandwich panel via curing of the sandwich panel. In some cases, overlapping the skin(s) at 404 may involve placing the insert in the bore first and then overlaying one or more skins over a portion of the insert. In other examples, overlapping the skin(s) at 404 includes raising at least part of the third outer skin away from the second skin, placing the insert in the bore, and then replacing the third outer skin back down on top of the enlarged flange of the insert and the second skin, thereby sandwiching the enlarged flange between the second skin and the third outer skin of the sandwich panel. In some examples, substantially all of an upper side of the enlarged flange may be covered by, or overlapped by, the second skin and/or the third skin, at 404. Compressing and curing the sandwich panel at 406 may include causing the second transverse face of the insert to go from sitting proud of the third outer skin to being at least substantially flush with the third outer skin.

Methods 400 also may include one or more steps from methods 300 of FIG. 23, such as preparing the first skin of the sandwich panel at 302, positioning the core on the first skin at 306, and/or forming the bore in the core at 304. Additionally or alternatively, methods 400 may include positioning an adhesive pack at 318 and/or coating and/or knurling the insert at 316 (also as seen in FIG. 23).

Figure 25:
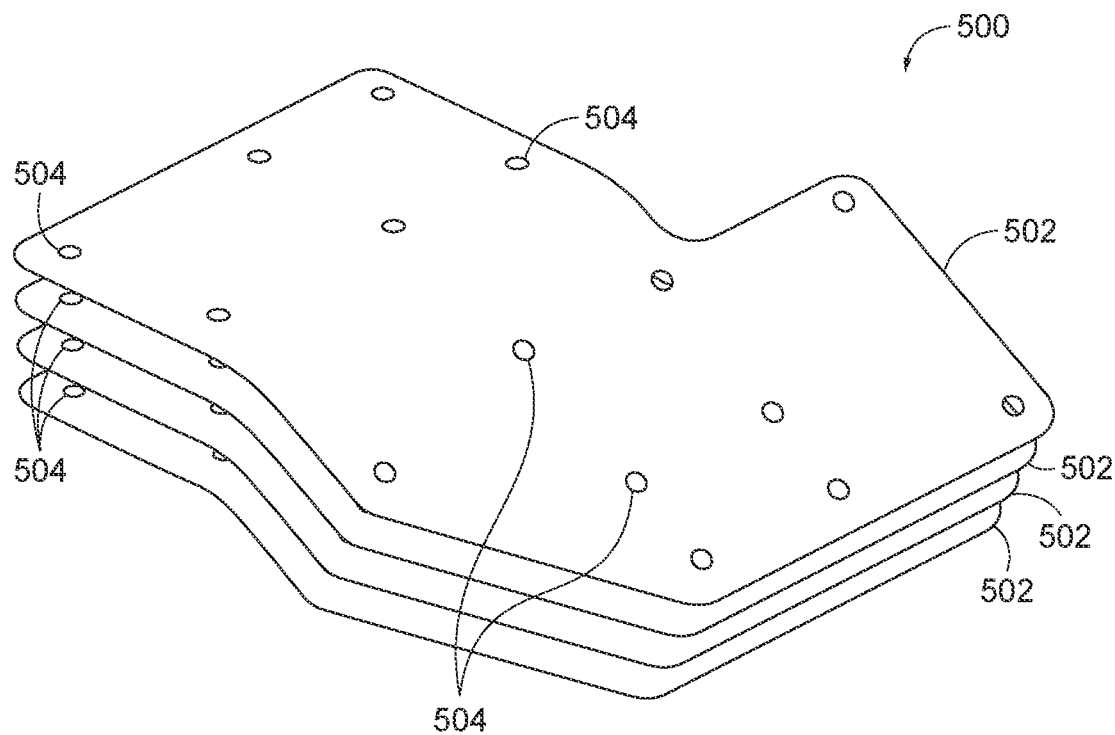
FIG. 25 is a top perspective view of an example of a composite part made according to methods of the present disclosure.

FIG. 25 shows an exploded view of an example part 500 made according to methods 300 and/or 400 of the present disclosure. Typical machining processes for forming composite parts may include water jet cutting of cured plies or panels, which can result in frayed fibers and rounded edges, and/or using cutters and drill presses on materials such as cured Kevlar panels, which can create excessive dust as well as wear on drill bits and cutters. In presently disclosed methods 300 and 400, individual plies 502 may be cut via ultrasonic cutting, and then stacked to form part 500. For example, plies 502 may be cut with a numerically controlled ultrasonic knife or cutting machine, and holes 504 may be drilled. Then a plurality of cut plies 502 may be stacked in a particular order to form the desired features or cross section of the resulting part 500. The stack-up of plies 502 may be understood as analogous to additive manufacturing techniques such that laminated object manufacturing. In some examples, plies 502 may be aligned using tools, frames, pins, or the like, and then the stack of plies 502 may be cured. Metal features or reinforcements, inserts 50, and/or other details may be embedded between respective plies 502 in the stack-up and cured together.

Non-exclusive examples of inventive subject matter according to the present disclosure are described in the following enumerated paragraphs:

A1. A skin-bonded threaded insert (50) configured to be installed in a bore (20) of a sandwich panel (12), the sandwich panel (12) comprising a first skin (16), a second skin (18) opposite the first skin (16), and a core (14) therebetween; the skin-bonded threaded insert (50) comprising:

a main body (52) configured to extend longitudinally through at least part of the core (14) of the sandwich panel (12) from a first transverse face (72) of the main body (52) to a second transverse face (74) of the main body (52), wherein an exterior circumferential surface (76) of the main body (52) is configured to engage the core (14) of the sandwich panel (12) when the skin-bonded threaded insert (50) is installed in the sandwich panel (12);

a hole (54) extending longitudinally through at least a portion of the main body (52), the hole (54) comprising:

a threaded portion (78) that is threaded such that it is configured to engage a fastener (48), wherein the threaded portion (78) extends longitudinally along at least a portion of a length (84) of the hole (54) in a longitudinal direction, and wherein the threaded portion (78) has a major diameter corresponding to a maximum diameter (86) of the threaded portion (78);

a first enlarged portion (80) having an enlarged diameter (88) that is greater than the major diameter of the threaded portion (78); and a shelf (82) formed at a transition between the first enlarged portion (80) and the threaded portion (78); and a collar (58) that is sized with respect to the first enlarged portion (80) of the hole (54) such that an external surface (90) of the collar (58) has a friction fit with the first enlarged portion (80), wherein the collar (58) is configured to be longitudinally translated with respect to the main body (52), to transition the collar (58) between a raised position and a compressed position during installation of the skin-bonded threaded insert (50) in the sandwich panel (12).

A1.1. The skin-bonded threaded insert (50) of paragraph A1, wherein the first transverse face (72) of the main body (52) engages with the first skin (16).

A1.2. The skin-bonded threaded insert (50) of paragraph A1 or A1.1, wherein the second transverse face (74) of the main body (52) engages with the second skin (18).

A1.3. The skin-bonded threaded insert (50) of any of paragraphs A1-A1.2, wherein the first transverse face (72) of the main body (52) engages with the core (14).

A1.4. The skin-bonded threaded insert (50) of any of paragraphs A1-A1.2, wherein the second transverse face (74) of the main body (52) engages with the core (14).

A1.5. The skin-bonded threaded insert (50) of any of paragraphs A1-A1.4, wherein in the raised position, a lower surface (92) of the collar (58) is positioned such that it is facing and spaced apart from the shelf (82) of the hole (54) by a collar displacement distance (94).

A1.6. The skin-bonded threaded insert (50) of paragraph A1.5, wherein in the compressed position, the collar displacement distance (94) is less than when the collar (58) is in the raised position, such that the lower surface (92) of the collar (58) is closer to the shelf (82) when the collar (58) is in the compressed position than when the collar (58) is in the raised position.

A1.7. The skin-bonded threaded insert (50) of any of paragraphs A1-A1.6, wherein in the compressed position, the lower surface (92) of the collar (58) is engaged with the shelf (82) of the hole (54).

A2. The skin-bonded threaded insert (50) of any of paragraphs A1-A1.7, further comprising a thermoset resin coating (46) on the first transverse face (72), the second transverse face (74), and/or the exterior circumferential surface (76) of the main body (52).

A2.1. The skin-bonded threaded insert (50) of paragraph A2, wherein the thermoset resin coating (46) is configured to flow during curing of the sandwich panel (12), to bond the skin-bonded threaded insert (50) within the sandwich panel (12).

A2.2. The skin-bonded threaded insert (50) of paragraph A2 or A2.1, wherein the thermoset resin coating (46) is configured to conform to imperfection in a thickness of the sandwich panel (12).

A3. The skin-bonded threaded insert (50) of any of paragraphs A1-A2.2, wherein the skin-bonded threaded insert (50) is configured to receive a secondary object (48) within the hole (54), the secondary object (48) being configured to transfer a localized load to the sandwich panel (12) via the skin-bonded threaded insert (50).

A4. The skin-bonded threaded insert (50) of any of paragraphs A1-A3, wherein the skin-bonded threaded insert (50) is configured to receive the fastener (48) within the hole (54), via the threaded portion (78).

A5. The skin-bonded threaded insert (50) of any of paragraphs A1-A4, wherein the hole (54) is a blind hole (54).

A6. The skin-bonded threaded insert (50) of any of paragraphs A1-A4, wherein the hole (54) is a through-hole (54).

A7. The skin-bonded threaded insert (50) of any of paragraphs A1-A6, wherein the external surface (90) of the collar (58) is threaded.

A8. The skin-bonded threaded insert (50) of any of paragraphs A1-A7, wherein the collar (58) is internally threaded.

A9. The skin-bonded threaded insert (50) of any of paragraphs A1-A8, wherein the collar (58) is configured to act as a thread lock (69) for locking the skin-bonded threaded insert (50) in place within the sandwich panel (12).

A10. The skin-bonded threaded insert (50) of any of paragraphs A1-A9, further comprising a/the thread lock (69).

A11. The skin-bonded threaded insert (50) of any of paragraphs A1-A10, wherein the collar (58) is configured to be positioned within the first enlarged portion (80) of the hole (54) at the time when the skin-bonded threaded insert (50) is coated with a thermoset resin coating (46).

A12. The skin-bonded threaded insert (50) of any of paragraphs A1-A11, wherein the collar (58) comprises a/the thermoset resin coating (46) on the external surface (90), an upper surface (96), and/or the lower surface (92) of the collar (58).

A13. The skin-bonded threaded insert (50) of any of paragraphs A1-A12, wherein a/the thermoset resin comprises a phenolic resin.

A14. The skin-bonded threaded insert (50) of any of paragraphs A1-A13, wherein the first transverse face (72), the second transverse face (74), and/or the exterior circumferential surface (76) of the main body (52) are knurled.

A15. The skin-bonded threaded insert (50) of any of paragraphs A1-A14, wherein the external surface (90) of the collar (58) is knurled.

A16. The skin-bonded threaded insert (50) of any of paragraphs A1-A15, wherein the lower surface (92) of the collar (58) is pressed against the shelf (82) when the collar (58) is in the compressed position.

A17. The skin-bonded threaded insert (50) of any of paragraphs A1-A16, wherein the collar (58) is configured to be transitioned to the compressed position when the sandwich panel (12) is compressed, such that the sandwich panel (12) and the skin-bonded threaded insert (50) are compressed together.

A18. The skin-bonded threaded insert (50) of any of paragraphs A1-A17, wherein an/the upper surface (96) of the collar (58) is at least substantially flush with the second skin (18) when the collar (58) is in the compressed position, wherein the upper surface (96) of the collar (58) is opposite the lower surface (92) of the collar (58).

A19. The skin-bonded threaded insert (50) of any of paragraphs A1-A18, wherein an/the upper surface (96) of the collar (58) sits proud of the second skin (18) when the collar (58) is in the raised position.

A20. The skin-bonded threaded insert (50) of any of paragraphs A1-A19, wherein the skin-bonded threaded insert (50) is configured to be bonded to the sandwich panel (12) within the bore (20) of the sandwich panel (12) concurrently with bonding of the first skin (16), the second skin (18), and the core (14) of the sandwich panel (12).

A21. The skin-bonded threaded insert (50) of any of paragraphs A1-A20, wherein the skin-bonded threaded insert (50) is configured to be bonded within the bore (20) of the sandwich panel (12) without an added potting compound.

A22. The skin-bonded threaded insert (50) of any of paragraphs A1-A21, wherein the hole (54) further comprises a second enlarged portion (110) having a second enlarged diameter (112) that is greater than the major diameter of the threaded portion (78).

A22.1. The skin-bonded threaded insert (50) of paragraph A22, wherein the second enlarged diameter (112) is substantially equal to the enlarged diameter (88) of the first enlarged portion (80).

A22.2. The skin-bonded threaded insert (50) of any of paragraphs A22-A22.1, wherein the hole (54) comprises a second shelf (114) formed at a second transition between the second enlarged portion (110) and the threaded portion (78).

A22.3. The skin-bonded threaded insert (50) of any of paragraphs A22-A22.2, further comprising a second collar (116) that is sized with respect to the second enlarged portion (110) of the hole (54) such that a second external surface (118) of the second collar (116) has a friction fit with the second enlarged portion (110), wherein the second collar (116) is configured to be transitioned between a second raised position and a second compressed position during installation of the skin-bonded threaded insert (50) in the sandwich panel (12), wherein in the second raised position, a second lower surface (120) of the second collar (116) is positioned such that it is spaced apart from a/the second shelf (114) of the hole (54), and wherein in the second compressed position, the second lower surface (120) of the second collar (116) is engaged with the second shelf (114) of the hole (54).

A22.4. The skin-bonded threaded insert (50) of any of paragraphs A22-A22.3, wherein a/the second external surface (118) of a/the second collar (116) is threaded.

A22.5. The skin-bonded threaded insert (50) of any of paragraphs A22-A22.4, wherein a/the second collar (116) is internally threaded.

A22.6. The skin-bonded threaded insert (50) of any of paragraphs A22-A22.5, wherein a/the second collar (116) is configured to be positioned within the second enlarged portion (110) of the hole (54) when the skin-bonded threaded insert (50) is coated with a/the thermoset resin.

A22.7. The skin-bonded threaded insert (50) of any of paragraphs A22-A22.6, wherein a/the second collar (116) comprises a/the thermoset resin coating a/the second external surface (118), a second upper surface (122), and/or a/the second lower surface (120) of the second collar (116).

A22.8. The skin-bonded threaded insert (50) of any of paragraphs A22-A22.7, wherein a/the second external surface (118) of a/the second collar (116) is knurled.

A22.9. The skin-bonded threaded insert (50) of any of paragraphs A22-A22.8, wherein a/the second lower surface (120) of a/the second collar (116) is pressed against a/the second shelf (114) when the second collar (116) is in a/the second compressed position.

A22.10. The skin-bonded threaded insert (50) of any of paragraphs A22-A22.9, wherein a/the second collar (116) is configured to be transitioned to a/the second compressed position when the sandwich panel (12) is compressed, such that the sandwich panel (12) and the skin-bonded threaded insert (50) are compressed together.

A22.11. The skin-bonded threaded insert (50) of any of paragraphs A22-A22.10, wherein a/the second upper surface (122) of a/the second collar (116) is flush with the first skin (16) when the second collar (116) is in the compressed position.

A22.12. The skin-bonded threaded insert (50) of any of paragraphs A22-A22.11, wherein a/the second upper surface (122) of a/the second collar (116) sits proud of the first skin (16) when the second collar (116) is in the raised position.

A23. The skin-bonded threaded insert (50) of any of paragraphs A1-A22.12, further comprising a floating threaded nut (64) positioned within the hole (54) of the skin-bonded threaded insert (50).

A23.1. The skin-bonded threaded insert (50) of paragraph A23, wherein a portion of the hole (54) is sized and shaped to accommodate and contain the floating threaded nut (64).

A24. The skin-bonded threaded insert (50) of any of paragraphs A1-A23.1, wherein the collar (58) is countersunk adjacent an/the upper surface (96) of the collar (58) to facilitate engagement with the fastener (48).

A25. The skin-bonded threaded insert (50) of any of paragraphs A1-A24, wherein the main body (52) further comprises an enlarged flange (60) that projects radially outward from the exterior circumferential surface (76).

A26. The skin-bonded threaded insert (50) of paragraph A25, wherein the enlarged flange (60) has a thickness that is at least 30%, at least 40%, at least 50%, at least 60%, at least 70%, and/or at least 80% of a second thickness (134) of the first enlarged portion (80).

A27. The skin-bonded threaded insert (50) of any of paragraphs A25-A26, wherein the enlarged flange (60) defines the first transverse face (72).

A28. The skin-bonded threaded insert (50) of any of paragraphs A25-A26, wherein the enlarged flange (60) defines the second transverse face (74).

A29. The skin-bonded threaded insert (50) of any of paragraphs A1-A28, further comprising external threads (67) on at least part of the exterior circumferential surface (76) of the main body (52).

A30. The skin-bonded threaded insert (50) of any of paragraphs A1-A29, further comprising a second insert part (70) configured to engage with the main body (52) such that at least part of the main body (52) is positioned within a receiving volume (150) of the second insert part (70) when the main body (52) is engaged with the second insert part (70), wherein engagement between the main body (52) and the second insert part (70) is selectively adjustable to adjust an overall height (152) of the main body (52) together with the second insert part (70).

A30.1. The skin-bonded threaded insert (50) of paragraph A30, wherein the second insert part (70) comprises a second exterior circumferential surface (156) configured to engage the core (14) of the sandwich panel (12), a panel-engaging transverse surface (158) configured to engage the first skin (16) or the second skin (18) of the sandwich panel (12), and an insert-facing transverse surface (160) configured to engage the main body (52).

A31. The skin-bonded threaded insert (50) of paragraph A30 or A30.1, wherein the second insert part (70) comprises internal threads (154) to engage the exterior circumferential surface (76) of the main body (52).

A32. The skin-bonded threaded insert (50) of any of paragraphs A30-A31, wherein a/the enlarged flange (60) of the main body (52) is configured to serve as a stop, such that the overall height (152) is at a minimum when the second insert part (70) contacts the enlarged flange (60).

A33. The skin-bonded threaded insert (50) of any of paragraphs A30-A32, wherein the second insert part (70) is coated with a/the thermoset resin.

A33.1. The skin-bonded threaded insert (50) of paragraph A33, wherein at least part of a/the second exterior circumferential surface (156) of the second insert part (70), at least part of an/the insert-facing transverse surface (160) of the second insert part (70), and/or at least part of a/the panel-engaging transverse surface (158) of the second insert part (70) are coated with the thermoset resin.

A34. The skin-bonded threaded insert (50) of any of paragraphs A30-A33.1, wherein at least part of a/the second exterior circumferential surface (156) of the second insert part (70), at least part of an/the insert-facing transverse surface (160) of the second insert part (70), and/or at least part of a/the panel-engaging transverse surface (158) of the second insert part (70) are knurled.

A35. The skin-bonded threaded insert (50) of any of paragraphs A30-A34, wherein the second insert part (70) is configured to engage with the main body (52) such that compression of the sandwich panel (12) and the collar (58) causes longitudinal translation of the main body (52) with respect to the second insert part (70), thereby reducing the overall height (152).

A36. The skin-bonded threaded insert (50) of any of paragraphs A30-A35, wherein the receiving volume (150) comprises an internal face (162) that is configured to limit longitudinal translation of the main body (52) with respect to the second insert part (70) when the sandwich panel (12) is compressed.

A37. The skin-bonded threaded insert (50) of any of paragraphs A30-A36, wherein a/the first transverse face (72) of the main body (52) engages a/the internal face (162) of the receiving volume (150) of the second insert part (70) when the sandwich panel (12) is compressed.

A38. The skin-bonded threaded insert (50) of any of paragraphs A30-A37, wherein the internal threads (154) of the second insert part (70) are configured to engage the main body (52) such that the main body (52) is ratcheted past the internal threads (154) when the sandwich panel (12) is compressed with sufficient force, thereby longitudinally translating the main body (52) with respect to the second insert part (70), and thereby reducing the overall height (152).

B1. A system (100), comprising:
the skin-bonded threaded insert (50) of any of paragraphs A1-A38; and
the sandwich panel (12), wherein the skin-bonded threaded insert (50) is positioned at least partially within the bore (20) of the sandwich panel (12).

B2. The system (100) of paragraph B1, wherein the skin-bonded threaded insert (50) is configured such that when the collar (58) is in the raised position, the upper surface (96) of the collar (58) sits proud of the second skin (18) of the sandwich panel (12), wherein the upper surface (96) of the collar (58) is opposite the lower surface (92) of the panel.

B3. The system (100) of paragraph B1 or B2, wherein the skin-bonded threaded insert (50) is configured such that when the collar (58) is in the compressed position, the upper surface (96) of the collar (58) is flush with or sub-flush to the second skin (18) of the sandwich panel (12).

B4. The system (100) of any of paragraphs B1-B3, wherein the sandwich panel (12) comprises a first panel hole (22) extending through the first skin (16), wherein the first panel hole (22) is at least substantially concentric with the hole (54) of the skin-bonded threaded insert (50).

B5. The system (100) of any of paragraphs B1-B4, wherein the sandwich panel (12) comprises a second panel hole (24) extending through the second skin (18), wherein the second panel hole (24) is at least substantially concentric with the hole (54) of the skin-bonded threaded insert (50).

B6. The system (100) of any of paragraphs B1-B5, wherein the sandwich panel (12) comprises:
the first skin (16) having a first inner skin surface (101) and a first outer skin surface (102) opposite the first inner skin surface (101);
the second skin (18) having a second inner skin surface (104) and a second outer skin surface (106) opposite the second inner skin surface (104), and the first outer skin surface (102) and the second outer skin surface (106) facing away from one another;
the core (14) sandwiched between the first inner skin surface (101) of the first skin (16) and the second inner skin surface (104) of the second skin (18); and the bore (20), wherein the bore (20) is formed in at least one of the first skin (16) and the second skin (18), and extending into the core (14).

B7. The system (100) of any of paragraphs B1-B6, wherein the bore (20) is formed in the first skin (16) and extends into the core (14) towards the second skin (18).

B8. The system (100) of any of paragraphs B1-B7, wherein the bore (20) is formed in the second skin (18) and extends into the core (14) towards the first skin (16).

B9. The system (100) of any of paragraphs B1-B8, wherein the core (14) comprises one or more of foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and polypropylene.

B10. The system (100) of any of paragraphs B1-B9, wherein the first skin (16) comprises one or more of a laminate of fiberglass-reinforced polymer, a laminate of carbon fiber-reinforced polymer, a thermoset polymer, an epoxy, sheet metal, carbon, aramid, aluminum, steel, plywood, balsa, teak, and hardwood.

B11. The system (100) of any of paragraphs B1-B10, wherein the second skin (18) comprises one or more of a laminate of fiberglass-reinforced polymer, a laminate of carbon fiber-reinforced polymer, a thermoset polymer, an epoxy, sheet metal, carbon, aramid, aluminum, steel, plywood, balsa, teak, and hardwood.

B12. The system (100) of any of paragraphs B1-B11, wherein the sandwich panel (12) comprises a composite panel.

B13. The system (100) of any of paragraphs B1-B12, wherein the bore (20) comprises a plurality of bores (20), each respective bore (20) of the plurality of bores (20) extending from at least one of the first skin (16) and the second skin (18), and into the core (14), wherein the skin-bonded threaded insert (50) comprises a plurality of skin-bonded threaded inserts (50), each of the plurality of skin-bonded threaded inserts (50) being the skin-bonded threaded insert (50) of any of paragraphs A1-A38, and wherein at least one of the plurality of skin-bonded threaded inserts (50) is installed within each respective bore (20) of the plurality of bores (20).

B14. The system (100) of any of paragraphs B1-B13, wherein the first skin (16), the second skin (18), and/or the core (14) are precision cut.

B15. The system (100) of any of paragraphs B1-B14, further comprising an adhesive pack (66) positioned between the main body (52) of the skin-bonded threaded insert (50) and the core (14) of the sandwich panel (12), wherein the adhesive pack (66) is configured to cure during curing of the sandwich panel (12).

B16. The system (100) of paragraph B15, wherein the adhesive pack (66) comprises a 2-part epoxy adhesive pack (66).

B17. The system (100) of any of paragraphs B15-B16, wherein the adhesive pack (66) is positioned adjacent the first transverse face (72) of the main body (52) of the skin-bonded threaded insert (50).

B18. The system (100) of any of paragraphs B15-B17, wherein the adhesive pack (66) is positioned adjacent the exterior circumferential surface (76) of the main body (52) of the skin-bonded threaded insert (50).

B19. The system (100) of any of paragraphs B15-B18, wherein the adhesive pack (66) is configured to be placed in the bore (20) of the sandwich panel (12) before the skin-bonded threaded insert (50).

B20. The system (100) of any of paragraphs B15-B19, wherein the adhesive pack (66) comprises a plurality of adhesive packs (66) positioned about the skin-bonded threaded insert (50).

B21. The system (100) of any of paragraphs B1-B20, wherein a/the enlarged flange (60) is positioned such that it engages the core (14) and the first skin (16) of the sandwich panel (12).

B22. The system (100) of any of paragraphs B1-B20, wherein a/the enlarged flange (60) is positioned such that it engages the core (14) and the second skin (18) of the sandwich panel (12).

C1. A method (300) of installing a skin-bonded threaded insert (50) into a sandwich panel (12), the method (300) comprising:

preparing (302) a first skin (16) of the sandwich panel (12);

positioning (306) a core (14) of the sandwich panel (12) on the first skin (16) such that a first side (172) of the core (14) faces the first skin (16);

forming (304) a bore (20) in the core (14) of the sandwich panel (12);

inserting (308) the skin-bonded threaded insert (50) into the bore (20), such that at least a portion of a main body (52) of the skin-bonded threaded insert (50) is positioned within the bore (20), and such that a collar (58) of the skin-bonded threaded insert (50) is in a raised position in which the collar (58) sits proud of a second side (174) of the core (14), wherein the second side (174) of the core (14) is opposite the first side (172) of the core (14);

positioning (310) a second skin (18) of the sandwich panel (12) onto the second side (174) of the core (14), such that the collar (58) of the skin-bonded threaded insert (50) sits proud of an outer surface of the second skin (18), wherein the second skin (18) comprises a through-hole (54) extending through the second skin (18), and wherein the collar (58) extends through the through-hole (54) once the second skin (18) is placed on the core (14); and compressing (312) the first skin (16), the core (14), and the second skin (18) together, with the skin-bonded threaded insert (50) in the bore (20), wherein the compressing (312) causes the collar (58) to be longitudinally translated with respect to the main body (52), to transition the collar (58) between a raised position and a compressed position.

C2. The method (300) of paragraph C1, wherein the skin-bonded threaded insert (50) is the skin-bonded threaded insert (50) of any of paragraphs A1-A38.

C3. The method (300) of any of paragraphs C1-C2, wherein in the raised position, a lower surface (92) of the collar (58) is positioned such that it is spaced apart from the shelf (82) of the hole (54), and wherein in the compressed position, the lower surface (92) of the collar (58) is engaged with the shelf (82) of the hole (54).

C4. The method (300) of any of paragraphs C1-C3, wherein the compressing (312) comprises longitudinally translating the collar (58) such that an upper surface (96) of the collar (58) is at least substantially flush with the outer surface of the second skin (18).

C5. The method (300) of any of paragraphs C1-C4, wherein the compressing (312) comprises curing the sandwich panel (12) such that the first skin (16), the second skin (18), the core (14), and the skin-bonded threaded insert (50) are all bonded together during the compressing.

C6. The method (300) of any of paragraphs C1-C5, wherein the compressing (312) comprises compressing the sandwich panel (12) and the skin-bonded threaded insert (50) without use of a potting compound or an additional adhesive.

C7. The method (300) of any of paragraphs C1-C6, further comprising positioning (318) an adhesive pack (66) between the main body (52) of the skin-bonded threaded insert (50) and the core (14) of the sandwich panel (12), wherein the adhesive pack (66) is configured to cure during the curing of the sandwich panel (12). C8. The method (300) of paragraph C7, wherein the adhesive pack (66) comprises a 2-part epoxy adhesive pack (66).

C9. The method (300) of any of paragraphs C7-C8, wherein the positioning (318) comprises positioning an/the adhesive pack (66) adjacent the first transverse face (72) of the main body (52) of the skin-bonded threaded insert (50).

C10. The method (300) of any of paragraphs C7-C9, wherein the positioning (318) comprises positioning an/the adhesive pack (66) adjacent the exterior circumferential surface (76) of the main body (52) of the skin-bonded threaded insert (50).

C11. The method (300) of any of paragraphs C7-C10, wherein the positioning (318) comprises positioning an/the adhesive pack (66) in the bore (20) of the sandwich panel (12) before the inserting the skin-bonded threaded insert (50).

C12. The method (300) of any of paragraphs C1-C11, wherein the preparing (302) the first skin (16) comprises precision cutting the first skin (16).

C13. The method (300) of any of paragraphs C1-C12, wherein the preparing (302) the first skin (16) comprises performing ultrasonic cutting to shape the first skin (16).

C14. The method (300) of any of paragraphs C1-C13, further comprising preparing (314) the second skin (18), wherein the preparing (314) the second skin (18) comprises precision cutting the second skin (18).

C15. The method (300) of any of paragraphs C1-C14, further comprising preparing (314) the second skin (18), wherein the preparing (314) the second skin (18) comprises performing ultrasonic cutting to shape the second skin (18).

C16. The method (300) of any of paragraphs C1-C15, wherein the forming (306) the bore (20) in the core (14) of the sandwich panel (12) comprises precision cutting the core (14).

C17. The method (300) of any of paragraphs C1-C16, further comprising coating (316) the skin-bonded threaded insert (50) with a phenolic resin prior to the inserting the skin-bonded threaded insert (50).

C18. The method (300) of any of paragraphs C1-C17, further comprising knurling (316) one or more surfaces of the skin-bonded threaded insert (50).

D1. A skin-bonded threaded insert (50) configured to be installed in a bore (20) of a sandwich panel (12), the sandwich panel (12) comprising a first skin (16), a second skin (18) opposite the first skin (16), a third outer skin (136), and a core (14) positioned between the first skin (16) and the second skin (18); the skin-bonded threaded insert (50) comprising:

a main body (52) configured to extend longitudinally through the core (14) of the sandwich panel (12), wherein a second transverse face (74) of the main body (52) is opposite a first transverse face (72);

a hole (54) extending longitudinally through at least a portion of the main body (52); and an enlarged flange (60) having a flange diameter (138) that is larger than a body diameter of the main body (52), wherein the enlarged flange (60) protrudes radially from the main body (52) at a position along a longitudinal axis (56) of the main body (52), wherein the position is between the first transverse face (72) and the second transverse face (74) such that the enlarged flange (60) is longitudinally offset from both the first transverse face (72) the second transverse face (74), wherein the enlarged flange (60) is configured to be positioned interiorly to the second skin (18) and/or the third outer skin (136) of the sandwich panel (12).

D1.1. The skin-bonded threaded insert (50) of paragraph D1, wherein the first transverse face (72) of the main body (52) engages with the core (14) of the sandwich panel (12).

D1.2. The skin-bonded threaded insert (50) of paragraph D1 or D1.1, wherein an exterior circumferential surface (76) of the main body (52) is configured to engage the core (14) of the sandwich panel (12) when the skin-bonded threaded insert (50) is installed in the sandwich panel (12).

D1.3. The skin-bonded threaded insert (50) of any of paragraphs D1-D1.2, wherein the enlarged flange (60) is configured to be positioned between the second skin (18) and the third outer skin (136) when the skin-bonded threaded insert (50) is installed within the sandwich panel (12).

D1.4. The skin-bonded threaded insert (50) of any of paragraphs D1-D1.2, wherein the enlarged flange (60) is configured to be positioned between the second skin (18) and the first skin (16) when the skin-bonded threaded insert (50) is installed within the sandwich panel (12), such that the enlarged flange (60) is interior to both the second skin (18) and the third outer skin (136).

D2. The skin-bonded threaded insert (50) of any of paragraphs D1-D1.4, further comprising a thermoset resin coating (46) on at least a portion of the skin-bonded threaded insert (50).

D2.1. The skin-bonded threaded insert (50) of paragraph D2, wherein the thermoset resin coating (46) is present on the second transverse face (74).

D2.2. The skin-bonded threaded insert (50) of paragraph D2, wherein the thermoset resin coating (46) is present on the enlarged flange (60).

D3. The skin-bonded threaded insert (50) of any of paragraphs D1-D2.2, further comprising a donut (144) pre-impregnated with a thermoset resin, wherein the donut (144) is positioned to circumscribe the main body (52), and wherein the donut (144) is configured to bond the skin-bonded threaded insert (50) in place within the bore (20) of the sandwich panel (12).

D4. The skin-bonded threaded insert (50) of paragraph D3, wherein the donut (144) extends radially outward form the main body (52), along an underside (146) of the enlarged flange (60).

D5. The skin-bonded threaded insert (50) of paragraph D4, wherein the donut (144) extends to cover at least 75% of the underside (146) of the enlarged flange (60).

D6. The skin-bonded threaded insert (50) of any of paragraphs D1-D5, wherein the skin-bonded threaded insert (50) is configured to be bonded to the second skin (18) and the third outer skin (136) when the sandwich panel (12) is cured.

D7. The skin-bonded threaded insert (50) of any of paragraphs D1-D6, wherein the enlarged flange (60) is beveled along an/the underside (146) of the enlarged flange (60).

D8. The skin-bonded threaded insert (50) of any of paragraphs D1-D7, wherein an/the underside (146) of the enlarged flange (60) is configured to engage the second skin (18).

D9. The skin-bonded threaded insert (50) of any of paragraphs D1-D8, wherein an upper side (148) of the enlarged flange (60) is configured to engage the third outer skin (136).

D10. The skin-bonded threaded insert (50) of any of paragraphs D1-D9, wherein an/the upper side (148) of the enlarged flange (60) is at least substantially parallel to the second transverse face (74).

D11. The skin-bonded threaded insert (50) of any of paragraphs D1-D10, wherein an/the upper side (148) of the enlarged flange (60) is substantially perpendicular to a/the longitudinal axis (56) of the main body (52) of the skin-bonded threaded insert (50).

D12. The skin-bonded threaded insert (50) of any of paragraphs D1-D11, further comprising a second insert part (70) configured to engage with the main body (52) such that at least part of the main body (52) is positioned within a receiving volume (150) of the second insert part (70) when the main body (52) is engaged with the second insert part (70), wherein engagement between the main body (52) and the second insert part (70) is selectively adjustable to adjust an overall height (152) of the main body (52) together with the second insert part (70).

D13. The skin-bonded threaded insert (50) of paragraph D12, wherein the second insert part (70) comprises a second exterior circumferential surface (156) configured to engage the core (14) of the sandwich panel (12), a panel-engaging transverse surface (158) configured to engage the first skin (16) or the second skin (18) of the sandwich panel (12), and an insert-facing transverse surface (160) opposite the panel-engaging transverse surface (158).

D13.1. The skin-bonded threaded insert (50) of paragraph D13, wherein the panel-engaging transverse surface (158) is configured to engage the main body (52) when an/the overall height (152) of the skin-bonded threaded insert (50) is minimized.

D13.2. The skin-bonded threaded insert (50) of paragraph D13, wherein the panel-engaging transverse surface (158) is configured to face a/the enlarged flange (60) of the main body (52).

D14. The skin-bonded threaded insert (50) of any of paragraphs D12-D13.1, wherein the second insert part (70) comprises internal threads (154) to engage the exterior circumferential surface (76) of the main body (52).

D15. The skin-bonded threaded insert (50) of any of paragraphs D12-D14, wherein the enlarged flange (60) of the main body (52) is configured to serve as a stop, such that the overall height (152) is at a minimum when the second insert part (70) contacts the enlarged flange (60).

D16. The skin-bonded threaded insert (50) of any of paragraphs D12-D15, wherein the second insert part (70) is coated with a/the thermoset resin.

D17. The skin-bonded threaded insert (50) of paragraph D16, wherein at least part of a/the second exterior circumferential surface (156) of the second insert part (70), at least part of an/the insert-facing transverse surface (160) of the second insert part (70), and/or at least part of a/the panel-engaging transverse surface (158) of the second insert part (70) are coated with the thermoset resin.

D18. The skin-bonded threaded insert (50) of any of paragraphs D12-D17, wherein at least part of a/the second exterior circumferential surface (156) of the second insert part (70), at least part of an/the insert-facing transverse surface (160) of the second insert part (70), and/or at least part of a/the panel-engaging transverse surface (158) of the second insert part (70) are knurled.

D19. The skin-bonded threaded insert (50) of any of paragraphs D12-D18, wherein the second insert part (70) is configured to engage with the main body (52) such that compression of the sandwich panel (12) causes longitudinal translation of the main body (52) with respect to the second insert part (70), thereby reducing the overall height (152).

D20. The skin-bonded threaded insert (50) of any of paragraphs D12-D19, wherein the receiving volume (150) comprises an internal face (162) that is configured to limit longitudinal translation of the main body (52) with respect to the second insert part (70) when the sandwich panel (12) is compressed.

D21. The skin-bonded threaded insert (50) of any of paragraphs D12-D20, wherein the first transverse face (72) of the main body (52) engages a/the internal face (162) of the receiving volume (150) of the second insert part (70) when the sandwich panel (12) is compressed.

D22. The skin-bonded threaded insert (50) of any of paragraphs D12-D21, wherein the internal threads (154) of the second insert part (70) are configured to engage the main body (52) such that the main body (52) is ratcheted past the internal threads (154) when the sandwich panel (12) is compressed with sufficient force, thereby longitudinally translating the main body (52) with respect to the second insert part (70), and thereby reducing the overall height (152).

D23. The skin-bonded threaded insert (50) of any of paragraphs D1-D22, further comprising a notched flange (68), wherein the notched flange (68) is adjacent to, or forms, the first transverse face (72), and wherein the notched flange (68) comprises a plurality of notches (164).

D24. The skin-bonded threaded insert (50) of paragraph D23, wherein the plurality of notches (164) are configured to receive an adhesive to bond the skin-bonded threaded insert (50) in place within a/the bore (20) of the sandwich panel (12).

D25. The skin-bonded threaded insert (50) of any of paragraphs D23-D24, wherein a notched flange diameter (166) of the notched flange (68) is less than the flange diameter (138) of the enlarged flange (60).

E1. A system (100), comprising:
the skin-bonded threaded insert (50) of any of paragraphs D1-D25; and
the sandwich panel (12), wherein the skin-bonded threaded insert (50) is positioned at least partially within the bore (20) of the sandwich panel (12).

E2. The system (100) of paragraph E1, wherein the sandwich panel (12) comprises a first panel hole (22) extending through the first skin (16), wherein the first panel hole (22) is substantially concentric with the hole (54) of the skin-bonded threaded insert (50).

E3. The system (100) of any of paragraphs E1-E2, wherein the sandwich panel (12) comprises a second panel hole (24) extending through the second skin (18), wherein the second panel hole (24) is substantially concentric with the hole (54) of the skin-bonded threaded insert (50).

E4. The system (100) of any of paragraphs E1-E3, wherein the sandwich panel (12) comprises:
the first skin (16) having a first inner skin surface (101) and a first outer skin surface (102) opposite the first inner skin surface (101);
the second skin (18) having a second inner skin surface (104) and a second outer skin surface (106) opposite the second inner skin surface (104), and the first outer skin surface (102) and the second outer skin surface (106) facing away from one another;

the core (14) sandwiched between the first inner skin surface (101) of the first skin (16) and the second inner skin surface (104) of the second skin (18); and the bore (20), wherein the bore (20) is formed in at least one of the first skin (16) and the second skin (18), and extending into the core (14).

E5. The system (100) of any of paragraphs E1-E4, wherein the bore (20) is formed in the first skin (16) and extends into the core (14) towards the second skin (18).

E6. The system (100) of any of paragraphs E1-E5, wherein the bore (20) is formed in the second skin (18) and extends into the core (14) towards the first skin (16).

E7. The system (100) of any of paragraphs E1-E6, wherein the core (14) comprises one or more of foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and polypropylene.

E8. The system (100) of any of paragraphs E1-E7, wherein the first skin (16) comprises one or more of a laminate of fiberglass-reinforced polymer, a laminate of carbon fiber-reinforced polymer, a thermoset polymer, an epoxy, sheet metal, carbon, aramid, aluminum, steel, plywood, balsa, teak, and hardwood.

E9. The system (100) of any of paragraphs E1-E8, wherein the second skin (18) comprises one or more of a laminate of fiberglass-reinforced polymer, a laminate of carbon fiber-reinforced polymer, a thermoset polymer, an epoxy, sheet metal, carbon, aramid, aluminum, steel, plywood, balsa, teak, and hardwood.

E10. The system (100) of any of paragraphs E1-E9, wherein the sandwich panel (12) comprises a composite panel.

E11. The system (100) of any of paragraphs E1-E10, wherein the bore (20) comprises a plurality of bores (20), each respective bore (20) of the plurality of bores (20) extending from at least one of the first skin (16) and the second skin (18), and into the core (14), wherein the skin-bonded threaded insert (50) comprises a plurality of skin-bonded threaded inserts (50), each of the plurality of skin-bonded threaded inserts (50) being the skin-bonded threaded insert (50) of any of paragraphs D1-D25, and wherein at least one of the plurality of skin-bonded threaded inserts (50) is installed within each respective bore (20) of the plurality of bores (20).

E12. The system (100) of any of paragraphs E1-E11, wherein the first skin (16), the second skin (18), and/or the core (14) are precision cut.

E13. The system (100) of any of paragraphs E1-E12, further comprising the third outer skin (136) positioned adjacent a/the second outer surface of the second skin (18), wherein the enlarged flange (60) of the skin-bonded threaded insert (50) is positioned between the second skin (18) and the third outer skin (136).

E14. The system (100) of any of paragraphs E1-E13, wherein the second skin (18) comprises a depression that corresponds with an underside (146) of the enlarged flange (60) of the skin-bonded threaded insert (50).

E15. The system (100) of any of paragraphs E1-E14, wherein the second transverse face (74) of the skin-bonded threaded insert (50) engages and/or is at least substantially flush with the third outer skin (136) of the sandwich panel (12).

E16. The system (100) of any of paragraphs E1-E15, further comprising an adhesive pack (66) positioned between the main body (52) of the skin-bonded threaded insert (50) and the core (14) of the sandwich panel (12), wherein the adhesive pack (66) is configured to cure during curing of the sandwich panel (12).

E17. The system (100) of paragraph E16, wherein the adhesive pack (66) comprises a 2-part epoxy adhesive pack (66).

E18. The system (100) of any of paragraphs E16-E17, wherein the adhesive pack (66) is positioned adjacent the first transverse face (72) of the main body (52) of the skin-bonded threaded insert (50).

E19. The system (100) of any of paragraphs E16-E18, wherein the adhesive pack (66) is positioned adjacent the exterior circumferential surface (76) of the main body (52) of the skin-bonded threaded insert (50).

E20. The system (100) of any of paragraphs E16-E19, wherein the adhesive pack (66) is configured to be placed in the bore (20) of the sandwich panel (12) before the skin-bonded threaded insert (50).

E21. The system (100) of any of paragraphs E16-E20, wherein the adhesive pack (66) comprises a plurality of adhesive packs (66) positioned about the skin-bonded threaded insert (50).

F1. A method (400) of installing a skin-bonded threaded insert (50) in a sandwich panel (12), the sandwich panel (12) comprising a first skin (16), a second skin (18) opposite the first skin (16), a third outer skin (136) adjacent the second skin (18), and a core (14) positioned between the first skin (16) and the second skin (18), the method (300) comprising:

placing (402) the skin-bonded threaded insert (50) into a bore (20) that extends through at least a portion of the core (14);

overlapping (404) an enlarged flange (60) of the skin-bonded threaded insert (50) with the second skin (18) and/or the third outer skin (136); and compressing and curing (406) the sandwich panel (12) and the skin-bonded threaded insert (50) together, thereby bonding the skin-bonded threaded insert (50) to the second skin (18) and the third outer skin (136) via curing of the sandwich panel (12).

F2. The method (400) of paragraph F1, wherein the skin-bonded threaded insert (50) comprises the skin-bonded threaded insert (50) of any of paragraphs D1-D25.

F3. The method (400) of any of paragraphs F1-F2, further comprising raising at least part of the third outer skin (136) away from the second skin (18) before the placing (402) the skin-bonded threaded insert (50) into the bore (20).

F4. The method (400) of paragraph F3, further comprising placing the third outer skin (136) back onto the second skin (18) such that the third outer skin (136) overlaps the enlarged flange (60) such that the enlarged flange (60) is sandwiched between the second skin (18) and the third outer skin (136).

F5. The method (400) of any of paragraphs F1-F4, wherein the bore (20) extends through the second skin (18) and the third outer skin (136).

F6. The method (400) of any of paragraphs F1-F5, wherein the overlapping (404) comprises overlapping substantially all of an upper side (148) of the enlarged flange (60) with the second skin (18).

F7. The method (400) of any of paragraphs F1-F6, wherein the overlapping (404) comprises overlapping substantially all of an/the upper side (148) of the enlarged flange (60) with the third outer skin (136).

F8. The method (400) of any of paragraphs F1-F7, further comprising:

preparing (302) the first skin (16) of the sandwich panel (12);

positioning (306) the core (14) of the sandwich panel (12) on the first skin (16) such that a first face of the core (14) faces the first skin (16); and forming (304) the bore (20) in the core (14) of the sandwich panel (12).

F9. The method (400) of any of paragraphs F1-F8, wherein the second transverse face (74) of the skin-bonded threaded insert (50) sits proud of the third outer skin (136), the method (400) further comprising compressing (312) the first skin (16), the core (14), the second skin (18), and the third outer skin (136) together, with the skin-bonded threaded insert (50) in the bore (20), wherein the compressing (312) causes the second transverse face (74) to be at least substantially flush with the third outer skin (136).

F10. The method (400) of paragraph F9, wherein the compressing (312) comprises curing the sandwich panel (12) such that the first skin (16), the second skin (18), the third outer skin (136), the core (14), and the skin-bonded threaded insert (50) are all bonded together during the compressing (312).

F11. The method (400) of any of paragraphs F1-F10, further comprising positioning (318) an adhesive pack (66) between the main body (52) of the skin-bonded threaded insert (50) and the core (14) of the sandwich panel (12), wherein the adhesive pack (66) is configured to cure during the curing of the sandwich panel (12).

F12. The method (400) of paragraph F11, wherein the adhesive pack (66) comprises a 2-part epoxy adhesive pack (66).

F13. The method (400) of any of paragraphs F11-F12, wherein the positioning (318) comprises positioning an/the adhesive pack (66) adjacent the first transverse face (72) of the main body (52) of the skin-bonded threaded insert (50).

F14. The method (400) of any of paragraphs F11-F13, wherein the positioning (318) comprises positioning an/the adhesive pack (66) adjacent the exterior circumferential surface (76) of the main body (52) of the skin-bonded threaded insert (50).

F15. The method (400) of any of paragraphs F11-F14, wherein the positioning (318) comprises positioning an/the adhesive pack (66) in the bore (20) of the sandwich panel (12) before the inserting the skin-bonded threaded insert (50).

F16. The method (400) of any of paragraphs F1-F15, further comprising precision cutting the first skin (16).

F17. The method (400) of any of paragraphs F1-F16, further comprising performing ultrasonic cutting to shape the first skin (16).

F18. The method (400) of any of paragraphs F1-F17, further comprising preparing (314) the second skin (18), wherein the preparing (314) the second skin (18) comprises precision cutting the second skin (18).

F19. The method (400) of any of paragraphs F1-F18, further comprising preparing (314) the second skin (18), wherein the preparing the second skin (18) comprises performing ultrasonic cutting to shape the second skin (18).

F20. The method (400) of any of paragraphs F1-F19, further comprising precision cutting the core (14).

F21. The method (400) of any of paragraphs F1-F20, further comprising coating (316) the skin-bonded threaded insert (50) with a phenolic resin prior to the inserting the skin-bonded threaded insert (50).

F22. The method (400) of any of paragraphs F1-F21, further comprising knurling (316) one or more surfaces of the skin-bonded threaded insert (50).

G1. An apparatus (28) including at least one system (100) according to any of paragraphs B1-B22 and/or paragraphs E1-E21.

G2. The apparatus (28) of paragraph G1, wherein the apparatus (28) comprises one or more of an aircraft (30), a satellite, an antenna, a transit vehicle, a shipping container, an automobile, and a shelter.

G3. The apparatus (28) of any of paragraphs G1-G2, wherein the sandwich panel (12) forms a portion of one or more of a floor, a galley, an interior main structure, a secondary structure, an interior wall, a stow bin, an overhead compartment, a lavatory, a capsule panel, a nose cone, an instrumentation enclosure, a bulkhead panel, a curtain wall, a partition, and a divider panel in the apparatus (28).

H1. Use of the skin-bonded threaded insert (50) of any of paragraphs A1-A38 and/or paragraphs D1-D25 to receive a secondary object (48) within the hole (54) of the skin-bonded threaded insert (50), to transfer the localized load to the sandwich panel (12) via the skin-bonded threaded insert (50).

I1. Use of the system (100) of any of paragraphs B1-B22 and/or paragraphs E1-E21 to construct a portion of one or more of an aircraft (30), a satellite, an antenna, a transit vehicle, a shipping container, an automobile, and a shelter.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A skin-bonded threaded insert configured to be installed in a bore of a sandwich panel, the sandwich panel comprising a first skin, a second skin opposite the first skin, and a core therebetween; the skin-bonded threaded insert comprising:
  a main body configured to extend longitudinally through at least part of the core of the sandwich panel from a first transverse face of the main body to a second transverse face of the main body, wherein an exterior circumferential surface of the main body is configured to engage the core of the sandwich panel when the skin-bonded threaded insert is installed in the sandwich panel wherein the main body is a monolithic main body, and wherein the main body comprises a hole extending longitudinally through at least a portion of the main body, the hole comprising:
    a threaded portion that is threaded such that it is configured to engage a fastener, wherein the threaded portion extends longitudinally along at least a portion of a length of the hole in a longitudinal direction, and wherein the threaded portion has a major diameter corresponding to a maximum diameter of the threaded portion;
    a first enlarged portion having an enlarged diameter that is greater than the major diameter of the threaded portion; and
    a shelf formed at a transition between the first enlarged portion and the threaded portion; and
  a collar that is sized with respect to the first enlarged portion of the hole such that an external surface of the collar has a friction fit with the first enlarged portion, wherein the collar is configured to be longitudinally translated with respect to the main body, to transition the collar between a raised position and a compressed position during installation of the skin-bonded threaded insert in the sandwich panel, wherein the collar is configured to be engaged with the first enlarged portion in both the raised position and the compressed position.

2. The skin-bonded threaded insert according to claim 1, wherein the first transverse face of the main body engages with the first skin.

3. The skin-bonded threaded insert according to claim 1, wherein in the raised position, a lower surface of the collar is positioned such that it is facing and spaced apart from the shelf of the hole by a collar displacement distance.

4. The skin-bonded threaded insert according to claim 3, wherein in the compressed position, the collar displacement distance is less than when the collar is in the raised position, such that the lower surface of the collar is closer to the shelf when the collar is in the compressed position than when the collar is in the raised position.

5. The skin-bonded threaded insert according to claim 1, further comprising a thermoset resin coating on the first transverse face, the second transverse face, and the exterior circumferential surface of the main body, wherein the thermoset resin is configured to flow during curing of the sandwich panel, to bond the skin-bonded threaded insert within the sandwich panel.

6. The skin-bonded threaded insert according to claim 1, wherein the first transverse face and the second transverse face of the main body are knurled.

7. The skin-bonded threaded insert according to claim 1, wherein the collar is configured to be transitioned to the compressed position when the sandwich panel is compressed, such that the sandwich panel and the skin-bonded threaded insert are compressed together.

8. The skin-bonded threaded insert according to claim 1, wherein an upper surface of the collar is at least substantially flush with the second skin when the collar is in the compressed position, wherein the upper surface of the collar is opposite a lower surface of the collar, and wherein the upper surface of the collar sits proud of the second skin when the collar is in the raised position.

9. The skin-bonded threaded insert according to claim 1, wherein the skin-bonded threaded insert is configured to be bonded to the sandwich panel within the bore of the sandwich panel concurrently with bonding of the first skin, the second skin, and the core of the sandwich panel.

10. The skin-bonded threaded insert according to claim 1, wherein the hole further comprises a second enlarged portion having a second enlarged diameter that is greater than the major diameter of the threaded portion, wherein the hole comprises a second shelf formed at a second transition between the second enlarged portion and the threaded portion, and wherein the skin-bonded threaded insert further comprises a second collar that is sized with respect to the second enlarged portion of the hole such that a second external surface of the second collar has a friction fit with the second enlarged portion, wherein the second collar is configured to be transitioned between a second raised position and a second compressed position during installation of the skin-bonded threaded insert in the sandwich panel, wherein in the second raised position, a second lower surface of the second collar is positioned such that it is spaced apart from the second shelf of the hole, and wherein in the second compressed position, the second lower surface of the second collar is engaged with the second shelf of the hole.

11. The skin-bonded threaded insert according to claim 1, further comprising a floating threaded nut positioned within the hole of the skin-bonded threaded insert.

12. The skin-bonded threaded insert according to claim 1, wherein the main body further comprises an enlarged flange that projects radially outward from the exterior circumferential surface, wherein the enlarged flange defines the first transverse face.

13. The skin-bonded threaded insert according to claim 1, further comprising a second insert part configured to engage with the main body such that at least part of the main body is positioned within a receiving volume of the second insert part when the main body is engaged with the second insert part, wherein engagement between the main body and the second insert part is selectively adjustable to adjust an overall height of the main body together with the second insert part, wherein the second insert part comprises a second exterior circumferential surface configured to engage the core of the sandwich panel, a panel-engaging transverse surface configured to engage the first skin or the second skin of the sandwich panel, and an insert-facing transverse surface configured to engage the main body.

14. The skin-bonded threaded insert according to claim 13, wherein the second insert part comprises internal threads to engage the exterior circumferential surface of the main body, wherein the second insert part is configured to engage with the main body such that compression of the sandwich panel and the collar causes longitudinal translation of the main body with respect to the second insert part, thereby reducing the overall height, and wherein the internal threads of the second insert part are configured to engage the main body such that the main body ratchets past the internal threads when the sandwich panel is compressed with sufficient force, thereby longitudinally translating the main body with respect to the second insert part, and thereby reducing the overall height.

15. A method of installing the skin-bonded threaded insert according to claim 1 into the sandwich panel, the method comprising:

preparing the first skin, where in the preparing comprises ultrasonic cutting to shape the first skin of the sandwich panel;

positioning the core of the sandwich panel on the first skin such that a first face of the core faces the first skin;

forming the bore in the core of the sandwich panel;

inserting the skin-bonded threaded insert into the bore, such that at least a portion of the main body of the skin-bonded threaded insert is positioned within the bore, and such that the collar of the skin-bonded threaded insert is in the raised position in which the collar sits proud of a second face of the core, wherein the second face of the core is opposite the first face of the core;

positioning the second skin of the sandwich panel onto the second face of the core, such that the collar of the skin-bonded threaded insert sits proud of an outer surface of the second skin, wherein the second skin comprises a through-hole extending through the second skin, and wherein the collar extends through the through-hole once the second skin is placed on the core; and compressing the first skin, the core, and the second skin together, with the skin-bonded threaded insert in the bore, wherein the compressing causes the collar to be longitudinally translated with respect to the main body, to transition the collar between the raised position and the compressed position.

16. The method according to claim 15, further comprising positioning an adhesive pack between the main body of the skin-bonded threaded insert and the core of the sandwich panel, wherein the adhesive pack is configured to cure during curing of the sandwich panel.

17. A skin-bonded threaded insert configured to be installed in a bore of a sandwich panel, the sandwich panel comprising a first skin, a second skin opposite the first skin, a third outer skin, and a core positioned between the first skin and the second skin; the skin-bonded threaded insert comprising:

a main body configured to extend longitudinally through the core of the sandwich panel, wherein a second transverse face of the main body is opposite a first transverse face;

a hole extending longitudinally through at least a portion of the main body; and an enlarged flange having a flange diameter that is larger than a body diameter of the main body, wherein the enlarged flange protrudes radially from the main body at a position along a longitudinal axis of the main body, wherein the position is between the first transverse face and the second transverse face such that the enlarged flange is longitudinally offset from both the first transverse face and the second transverse face, wherein the enlarged flange is configured to be positioned interiorly to the second skin and/or the third outer skin of the sandwich panel.

18. The skin-bonded threaded insert according to claim 17, wherein the enlarged flange is configured to be positioned between the second skin and the third outer skin when the skin-bonded threaded insert is installed within the sandwich panel.

19. The skin-bonded threaded insert according to claim 17, wherein the enlarged flange is configured to be positioned between the second skin and the first skin when the skin-bonded threaded insert is installed within the sandwich panel, such that the enlarged flange is interior to both the second skin and the third outer skin.

20. The skin-bonded threaded insert according to claim 17, further comprising a notched flange, wherein the notched flange forms the first transverse face, and wherein the notched flange comprises a plurality of notches, wherein the plurality of notches are configured to receive an adhesive to bond the skin-bonded threaded insert in place within the bore of the sandwich panel, and wherein a notched flange diameter of the notched flange is less than the flange diameter of the enlarged flange.

* * * * *